(12) United States Patent
Modica et al.

(10) Patent No.: US 11,902,429 B2
(45) Date of Patent: Feb. 13, 2024

(54) DISTRIBUTED SECURE MULTI PARTY COMPUTATION

(71) Applicant: Robert Bosch GmbH, Stuttgart (DE)

(72) Inventors: Hanna Modica, Berlin (DE); Sebastian Becker, Ludwigsburg (DE); Sven Trieflinger, Renningen (DE); Vadim Raskin, Leonberg (DE); Volker Suschke, Falkensee (DE)

(73) Assignee: ROBERT BOSCH GMBH, Stuttgart (DE)

( * ) Notice: Subject to any disclaimer, the term of this patent is extended or adjusted under 35 U.S.C. 154(b) by 133 days.

(21) Appl. No.: 17/649,171

(22) Filed: Jan. 27, 2022

(65) Prior Publication Data

US 2022/0255731 A1 Aug. 11, 2022

(30) Foreign Application Priority Data

Feb. 10, 2021 (EP) ...................................... 21156230

(51) Int. Cl.
*H04L 9/08* (2006.01)
*H04L 9/00* (2022.01)

(52) U.S. Cl.
CPC .............. *H04L 9/085* (2013.01); *H04L 9/008* (2013.01)

(58) Field of Classification Search
CPC ..... H04L 9/085; H04L 9/008; H04L 12/4633; H04L 12/4641; H04L 67/10; G06F 9/455
See application file for complete search history.

(56) References Cited

U.S. PATENT DOCUMENTS

| | | | |
|---|---|---|---|
| 2003/0108195 A1* | 6/2003 | Okada ................... | H04L 9/0631 380/37 |
| 2019/0372760 A1 | 5/2019 | Zheng et al. | |
| 2020/0021568 A1 | 1/2020 | Becker et al. | |
| 2020/0084049 A1* | 3/2020 | Lindell ................. | H04L 9/085 |
| 2020/0153627 A1* | 5/2020 | Wentz ................. | G06F 21/6218 |
| 2020/0162251 A1* | 5/2020 | Wentz ..................... | G06F 21/64 |
| 2020/0186356 A1* | 6/2020 | Veeningen ............ | H04L 9/3218 |
| 2020/0228325 A1 | 7/2020 | Fan et al. | |
| 2021/0019194 A1 | 1/2021 | Bahl et al. | |
| 2021/0160288 A1* | 5/2021 | Crabtree ............. | H04L 41/0806 |
| 2023/0072358 A1* | 3/2023 | Baillargeon .......... | G06F 9/5088 |

OTHER PUBLICATIONS

Damgård I., Damgård K., Nielsen K., Nordholt P.S., Toft T. (2017) "Confidential Benchmarking Based on Multiparty Computation", In: Grosskalgs J., Preneel B. (eds) Financial Cryptography and Data Security, FC 2016, Lecture Notes in Computer Science, vol. 9603. Springer, Berlin, Heidelberg. Retrieved from the Internet on Jan. 27, 2022: https://eprint.iacr.org/2015/1006.pdf. 17 Pages.

(Continued)

*Primary Examiner* — Daniel B Potratz
(74) *Attorney, Agent, or Firm* — NORTON ROSE FULBRIGHT US LLP; Gerard A. Messina

(57) ABSTRACT

A computer-implemented method for providing a distributed data processing service for performing a secure multiparty computation of a function on at least first and second items of private input data using at least a first and a second computing engine communicatively coupled via a communication network.

16 Claims, 12 Drawing Sheets

(56) References Cited

OTHER PUBLICATIONS

Damgård I., Pastro V., Smart N., Zakarias S. "Multiparty Computation from Somewhat Homomorphic Encryption" in: Safavi-Naini R., Canetti R. (eds) Advances in Cryptology—CRYPTO 2012. CRYPTO 2012. Lecture Notes in Computer Science, vol. 7417. Springer, Berlin, Heidelberg. Retrieved from the Internet on Jan. 27, 2022: https://eprint.iacr.org/2011/535.pdf. 46 Pages.
Jakub Wójcik "Practical Assessment of Secure Multiparty Computation Frameworks" Network Architectures and Services, Mar. 2018. 7 Pages.
Joseph I. Choi et al. "Secure Multiparty Computation and Trusted Hardware: Examining Adoption Challenged and Opportunities" Hindawi Security and Communication Networks vol. 2019, Article ID 1368905. 29 Pages.
Marcella Hastings et al. "SoK: General Purpose Compilers for Secure Multi-Party Computation" 2019 IEEE Symposium on Security and Privacy. 18 Pages.
Rick Neison "Docker Swarm Load Balancing with NGINX and NGINX Plus" http://www.nginx.com/blog/docker-swarm-load-balancing-nginx-plus/#more-info, Dec. 2016, 12 Pages.

\* cited by examiner

DISTRIBUTED SECURE MULTI PARTY COMPUTATION

CROSS REFERENCE

The present application claims the benefit under 35 U.S.C. § 119 of European Patent Application No. EP 21 15 6230.1 filed on Feb. 10, 2021.

FIELD

The present invention relates to a computer-implemented method for providing a distributed data processing service for performing a secure multiparty computation, and an associated system and computer readable medium.

BACKGROUND INFORMATION

Secure multiparty computation (MPC) is a cryptographic computing technique enabling a plurality of parties to jointly compute a function on private inputs. The SPDZ protocol, for example, can provide security against a number of corrupted parties to the multiparty computation, assuming relative to at least one uncompromised party.

However, engines for MPC are usually academic prototypes delivered as executables intended to be operated in a specific research application scenario. These prototypes are inconvenient to incorporate into contemporary compute stacks. This means that the practical application of MPC can in many situations be impractical. Accordingly, secure multiparty computation may be further improved.

SUMMARY

According to a first aspect of the present invention, there is provided a computer-implemented method for providing a distributed data processing service for performing a secure multiparty computation of a function on at least first and second items of private input data using at least first and a second computing engines communicatively coupled via a communication network. In accordance with an example embodiment of the present invention, the method comprises:
  establishing, using the first computing engine, the distributed data processing service by binding at least the second computing engine to the first computing engine;
  generating, using a distributed cryptographic generation service provided by first and second cryptographic engines managed by the corresponding first and second computing engines, a plurality of cryptographic primitives required during an online phase of the secure multiparty computation, wherein a proportion of the cryptographic primitives are generated during an offline phase prior to the secure multiparty computation, and the plurality of cryptographic primitives are stored by a distributed cryptographic data store service provided by corresponding at least first and second cryptographic data stores managed by the respective first and second computing engines;
  obtaining, by the distributed data processing service, service invocations of a secure multiparty computation and at least first and second items of private input data;
  storing the at least first and second items of private input data in a distributed object store service of the distributed data processing service provided by at least first and second object store engines managed by the corresponding first and second computing engines;
  performing, during an online phase, a distributed secure multiparty computation on at least the first and second items of private input data using a multiparty computation service of the distributed data processing service provided by first and second multiparty computing engines managed by the corresponding first and second computing engines, wherein the first multiparty computing engine performs the secure multiparty computation together with at least the second multiparty computing engine; and
  storing at least one result of the secure multiparty computation via the distributed object store service, and/or outputting the at least one result to at least the first or second client.

Advantageously, the secure MPC technique detailed in the specification can provide a scalable, fault tolerant, and flexibly deployable secure computing solution.

In particular, a combination of secure MPC and secret sharing protocols enables an MPC computation to be broken down across a plurality of different computing engines. The computing engines may comprise conventional servers, or more flexible elastic compute resources using, for example the Kubernetes™ container orchestrator, or Mesos™ or Docker Swarm™. In other words, the component parts of the MPC algorithm and its ancillary services may be decomposed across a plurality of microservices. This enables the horizontal scaling of services independently, in accordance with a given workload. For example, a system within I/O intensive workload, for example, can have a highly scaled object store service, relative to other services of the distributed MPC implementation. A compute intensive workload could rely on an enlarged number of parallel, concurrent, multiparty computation services and distributed cryptographic generation services.

Another advantage is that the segregation of the generation of cryptographic primitives (material) to a distributed cryptographic generation service, and the consumption of the cryptographic by a distributed multiparty computation service enables the accumulation of an appropriate amount of cryptographic material in anticipation of a future compute load, for example. In periods of inactivity of the distributed multiparty competition service, a large number of cryptographic primitives may be stockpiled in a distributed cryptographic data store service to enable the rapid initialisation of a distributed multiparty computation.

A further advantage is that the component services of the distributed secure MPC service may be rapidly initialised or aborted, optionally in a context conserving manner, owing to the properties of container-based computation.

A further advantage is that clients are presented with a unified interface to the distributed multiparty computation service using, for example, a unified command line client.

In addition, adaptation of MPC algorithms of the SPDZ type from a single processor implementation onto containerised cloud compute contexts can cause additional considerations such as how to allocate tasks between the "off-line" and "online" phases for different workloads, and different configurations of containers. The coherence of data storage and distribution arrangements of the SPDZ implementation when distributed between a plurality of containers is also addressed in this specification. For example, cryptographic primitives are generated on a plurality of computing engines, although the cryptographic generation service is presented as a unified service to the high-level algorithm.

A further contribution of the present specification is the provision of a service mesh 32 to improve communication inside each computing engine VCP1, VCP2. For example, the SPDZ approach requires increased inter-process communication inside the sub-modules of each VCP between, for example, the MPC1, CGS1, CDA1, and OSE1, for example, to enable the distribution of shared secrets, or the performance of a distributed computation. The service mesh 32 approach disclosed herein improves the efficiency of inter-process communication during the performance of a SPDZ computation. Furthermore, the service may transparently secure the communication channels between microservices. The service may also facilitate routing when many instances of a computation are running concurrently.

Additionally, the containerised approach and the provision of a service mesh 32 enabling communication between modules inside a given VCP enables the distributed data processing service to be rapidly reconfigurable. For example, the compute load of an application might change from one which is predominantly calculation-based which is predominantly I/O based. In that case, the distributed data processing service may reduce the number of multiparty computing engines (MCE) required in each VCP, and increase the number of object store engines in each VCP, optionally using a Kubernetes™ orchestration approach.

Therefore, a distributed data processing service implementing MPC can rapidly reconfigure itself to different compute jobs.

According to a second aspect of the present invention, there is provided a system for providing a distributed data processing service for performing a secure multiparty computation of a function on at least first and second items of private input data.

According to a third aspect of the present invention, there is provided a computer-implemented method of a first computing engine for coordinating a distributed data processing service.

According to a fourth aspect of the present invention, there is provided a computer-implemented method of a second computing engine for participating in a distributed data processing service for performing a secure multiparty computation of a function.

According to a fifth aspect of the present invention, there is provided a computer readable medium or a data signal having encoded thereon at least one computer program defining machine-readable instructions which, when executed by a computer processor, is capable of carrying out the computer-implemented methods of the first, third, and fourth aspects.

The disclosure herein define further embodiments of the foregoing aspects of the present invention.

In the following description, a "distributed data processing service" means a persistent computer program hosted by one or more servers, hosted in one or more datacentres, sometimes referred to as a compute cloud. Clients of the distributed data processing service may upload data and invoke computation on the data, and eventually download transformed data from the distributed data processing service.

In the following description, a "secure multiparty computation" means the joint computation of a function on private inputs provided from a plurality of parties. The secure MPC may be based on, for example, the SPDZ protocol or its variants. A characteristic of the SPDZ protocol is that the laborious computation of cryptographic primitives may be performed off-line before the private inputs are received. An example, a variant of the SPDZ protocol as discussed in US 2019/0372760 A1, hereby incorporated by reference, may enable fault tolerant SPDZ allowing secure MPC to be performed even when some parties become unavailable during the online phase.

In the following description, a "virtual cloud (VC)" means a logical domain or simulated network that a plurality of edge devices (for example clients) may upload data to, download data from, and compute within. A virtual cloud is, for example, hosted on one or more servers, data centres being connected to the Internet. Typically virtual cloud is scalable and has support for container orchestration services such as Kubernetes™.

In the following description, a "service" may be associated with, or performed by, a "computing engine". In particular, an "engine" such as a "first object store engine" represents genuine computer logic that performs a computation on data. An "engine" may have one or a variable number of single-core or multicore processors allocated to it. An "engine" may be an abstraction such as a Kubernetes™ container containing or pointing to a logical compute element. On the other hand, a "service" is a unified interface between the one or more engines and the actors that need to invoke the one or more engines. In other words, a given data processing service "service" defines one service of any type (such as "cryptographic generation service"), which acts as an interface to an underlying set of compute engines. When a given service is invoked, a container orchestrator distribution of data and control commands from the interface of the given service to the underlying compute engines.

In the following description, a "distributed cryptographic generation service (CGS)" means, for example, a service that is capable of generating primitives possessing correlated randomness. In other words, the service generates one-time cryptographic primitives. Correlated randomness may be used, for example, to secure I/O of data from and to clients, and/or to perform MPC quickly and securely. In an embodiment, the CGS disclosed herein applies the MP-SPDZ algorithm implementation to generate instances of tuple types. In an embodiment, each "virtual cloud provider" (VCP) is organised into a lead VCP and N−1 slave VCPs, where N is the total number of VCPs. The lead VCP monitors the availability of different classes of cryptographic primitive (having correlated randomness) stored in other slave instances of the distributed cryptographic data store CDS on other computing engines. The operation of the distributed cryptographic generation service will be further described subsequently.

In an example embodiment of the present invention, the lead VCP interrogates a CDS using a telemetry API. Following the interrogation, a cryptographic primitive generation strategy is selected, cryptographic primitive generation jobs are initiated by the lead VCP, and replicated in the slave VCPs. In an embodiment, the cryptographic primitive generation jobs are queued for execution in the same order across all VCPs of the distributed data processing service. In an example embodiment of the present invention, the lead VCP follows implements a threshold-based figure of merit that tracks how many cryptographic primitives of a given class remain in the CDS of each computing engine of each VCP.

In an example embodiment of the present invention, when the lead VCP detects that the number of cryptographic primitives of a first type (such as inversion primitives) have fallen below in any one of the CDS's, the corresponding VCP of that compute engine is instructed by the lead VCP to generate a predetermined number of extra cryptographic inversion primitives.

In an example embodiment of the present invention, when the lead VCP detects that the number of cryptographic primitives of a second type (such as Beaver multiplication triples) have reached an upper threshold in any one of the CDSs, the corresponding VCP of all compute engines is/are instructed by the lead VCP to stop generating primitives of the second type in all other VCPs. Optionally, the corresponding VCP may instead be instructed to begin generating extra cryptographic primitives of a different type. A skilled person will appreciate that other methods of tracking the number of cryptographic primitives and detecting when to generate more cryptographic primitives may be used. In an embodiment, cryptographic primitive generation jobs are fetched and jointly executed by computing engines in each VCP. Such a consistent ordering of jobs may ensure that the VCPs remain coherent.

In the following description, a "distributed cryptographic data store service (CDS)" functions to receive and to store cryptographic primitives generated by a corresponding CGS on the same computing engine. It is a storage service for one-time cryptographic primitives consumed during computations. Furthermore, the CDS is configured to provide the stored cryptographic primitives on demand, or according to a schedule, to a distributed object store service (OSS), to be discussed subsequently, and/or the multiparty compute service. Optionally, the cryptographic primitives are one-time primitives.

The CGS therefore provides the cryptographic primitives required by the OSS and/or the Multiparty Computation Service (MCS) needed for executing the secure I/O protocols mediating access to the OSS, and also for performing the secure execution of MPC programs within the MCS using, for example, the MP-SPDZ algorithm. In an example, the cryptographic primitives are generated in different types to be used for different purposes. A cryptographic primitive may be one of an input mask, multiplication triples, Beaver multiplication triples, or square triples. The CGS may also be configured to generate random values for use as seeds, for example. The CDS optionally maintains a storage object for each type of cryptographic primitive. Individual cryptographic primitives may be referred to in this document as tuples, as they are tuples of type-dependent arity.

In an example embodiment of the present invention, the CDS reveals an application programming interface (API) configured to upload and/or download cryptographic primitives. In the same way as the OSS, in the embodiment the CDS interfaces to an object store provided by Amazon™ S3 or Google™ Object Storage that manages data as objects with associated meta data. In an embodiment, the CDS implements a consensus protocol for coordinating the order of delivery of cryptographic primitives to a requesting service or engine (such as the MCS or the OSS). The operation of a "distributed cryptographic data store service (CDS)" will be further described subsequently.

In the following description, a "distributed object store service (OSS)" means an object store for storing private input data from a plurality of clients and supporting a secret share scheme determined by the MPC protocol used by the distributed multiparty computation service. Optionally, output data is also stored in the OSS. Therefore, the OSS is similar to an object store provided by Amazon™ S3 or Google™ Object Storage that manages data as objects with associated meta data. In an embodiment, the OSS is a gateway to an external object store, for example Amazon™ S3 or Google™ Object Storage. The OSS supports the secret share scheme determined by the MPC protocol, where the secret sharing is performed on client software operating on clients VCC1, VCC2. In embodiment, the OSS applies additive secret sharing to securely store data across a plurality of VCPs to meet the condition that no (N−1) coalition of VCPs in any N-party VC can reconstruct the original data provided there is at least one honest (uncompromised) VCP.

Furthermore, the OSS and its implementing engines (OSEs) executed by each VCP provides I/O protocols enable error-resilient MPC computation in a client-server context. One example is as described by Damgård I., Damgård K., Nielsen K., Nordholt P. S., Toft T. (2017) "Confidential Benchmarking Based on Multiparty Computation", In: Grossklags J., Preneel B. (eds) Financial Cryptography and Data Security, FC 2016, Lecture Notes in Computer Science, vol 9603. Springer, Berlin, Heidelberg. This enables storage and computation to be delegated by an unbounded number of clients to a small set of MPC engines in the VC.

In an example embodiment of the present invention, the OSS is configured to multiplex a request of a first VCP to a plurality of, or all other, VCPs in the VC. In this case, the secret shares for the other VCPs are encrypted so that the first VCP cannot reconstruct the secret. The OSS is then configured to receive responses from the plurality of, or all other VCPs in the VC, assess consistency of the retrieved requested information before forwarding it. In this embodiment, only the non-sensitive metadata can be checked for consistency.

In an example embodiment of the present invention, the object store service exposes an API that allows, in the context of a "secret sharing" SS protocol, the first or the second or completely different clients to fetch the secret shares and recombine them to reconstruct the secret. Whether this is allowed or not is controlled by access control mechanisms (e.g. ACLs) that work on top of authenticated identities (e.g. by OpenID Connect).

In the following description, for simplicity the minimum number of VCPs, two, is illustrated and exemplified. However, school person will realise that the number of VCPs may be greater than two.

In the following description, a "distributed multiparty computation service" (MCS) is a serverless secure multi-party computing service. In an example embodiment of the present invnetion, the MCS is an extension of "Knative"™, a software framework for building and running serverless applications on Kubernetes™.

In an example embodiment of the present invention, an MPC in a first VCP1 communicates via the VC to an MPC in a second VCP2 using a communications network or fabric to provide a "function as a service" deployment model via the VC. In an example embodiment of the present invention, each VCP comprises a service mesh 32 for supporting MPC computations within a VCP, and inter-process communication within the MCS and the OSS, CDS, and CGS.

In an example embodiment of the present invention, each VCP uses "Istio"™ as the service mesh 32 for inter-process communication inside at least a first computing engine VCP1 between at least MPC1, CGS1, CDS1, and OSE1. Istio is an adaptable service mesh 32 for connecting computing engines (such as Kubernetes containers) that can rapidly scale up and down in size, providing discovery, failure recovery, routing, monitoring, and load balancing, for example. Alternatively, FaaS frameworks such as "Open-Faas"™ or "Kubeless"™ in combination with alternative service meshes such as "Linkerd"™ or "Kuma"™.

In an example embodiment of the present invention, the computation is orchestrated in a master/slave arrangement, where an MCS1 of one computing engine VCP1 organises and/or schedules communications with other MCSs and VCPs.

Accordingly, the MCS implements orchestration logic for coordinating the plurality of multiparty computing engines. In an example, the MCS may apply a MP-SPDZ MPC engine. For example, the MPC algorithm discussed in the paper "*Multiparty Computation from Somewhat Homomorphic Encryption*" Damgård I., Pastro V., Smart N., Zakarias S. (2012), in: Safavi-Naini R., Canetti R. (eds) Advances in Cryptology—CRYPTO 2012. CRYPTO 2012. Lecture Notes in Computer Science, vol 7417. Springer, Berlin, Heidelberg, may be applied. Implementations of other MPC frameworks such as "Fresco" or "Scale Mamba" can also be applied. The MCS inherits the security properties of the MPC framework algorithm applied. When using MP-SPDZ, confidentiality is guaranteed provided that at least one VCP remains honest (does not collude with the remaining (N−1) parties in an N-party VC. In addition, the system is actively secure. Malicious parties can deviate arbitrarily from the protocol.

Local multiparty computing engines in each VCP communicate with each other during the execution of an MPC programme. Accordingly, the MCS of a VCP designated as the "master" is configured to execute a discovery service to exchange network end point information, and to interact with other VCPs that may be designated as "slaves". Accordingly, the MCS may be configured to orchestrate network setup using the service mesh. The service of a lead VCP may be configured to coordinate the MPC services of following VCPs to coordinate the whole MPC execution, as will subsequently be discussed.

The MPC of each VCP is also configured to read data from, and/or write data to, the respective object store (OSS) of the VCP. For example, a client of an individual VCP may provide an ordered list of OSS input objects by means of unique OSS object identifiers. The corresponding object secret shares to be stored in the OSS may be read by the MPC service of the VCP from the collocated OSS in the VCP before execution of the MPC routine by the MCS by means, for example, of a network socket connection. At the end of the MPC routine's execution, the MPC optionally writes objects into the collocated OSS. The unique object identifiers for output object shares may, for example, be derived deterministically from an execution identifier submitted by a client when triggering an execution.

In the following description, the "SPDZ algorithm" refers particular, such an algorithm has an "offline phase" and an "online phase", or in other words comprises at least two phases.

In the "offline" phase, cryptographic primitives are computed such as multiplication triples. The "off-line phase" is considered to be the more computationally intensive phase of the SPDZ protocol. In the "online" phase, the MPC of each VCP uses the cryptographic primitives to perform secure MPC. Prior to the off-line and online phases, cryptographic keys should be generated, including public cryptographic parameters, public keys, private key shares (possessed by each client party) and MAC key shares (possessed by each client party).

Further detail about fault tolerant multiparty computations using SPDZ is described in U.S. Patent Application Publication No. US 2019/0372760 A1, which is hereby incorporated by reference.

Exemplary embodiments of the present invention are depicted in the figures, which are not to be construed as limiting the present invention, and are explained in greater detail below.

DETAILED DESCRIPTION OF EXAMPLE EMBODIMENTS

Overview

Figure 1A:
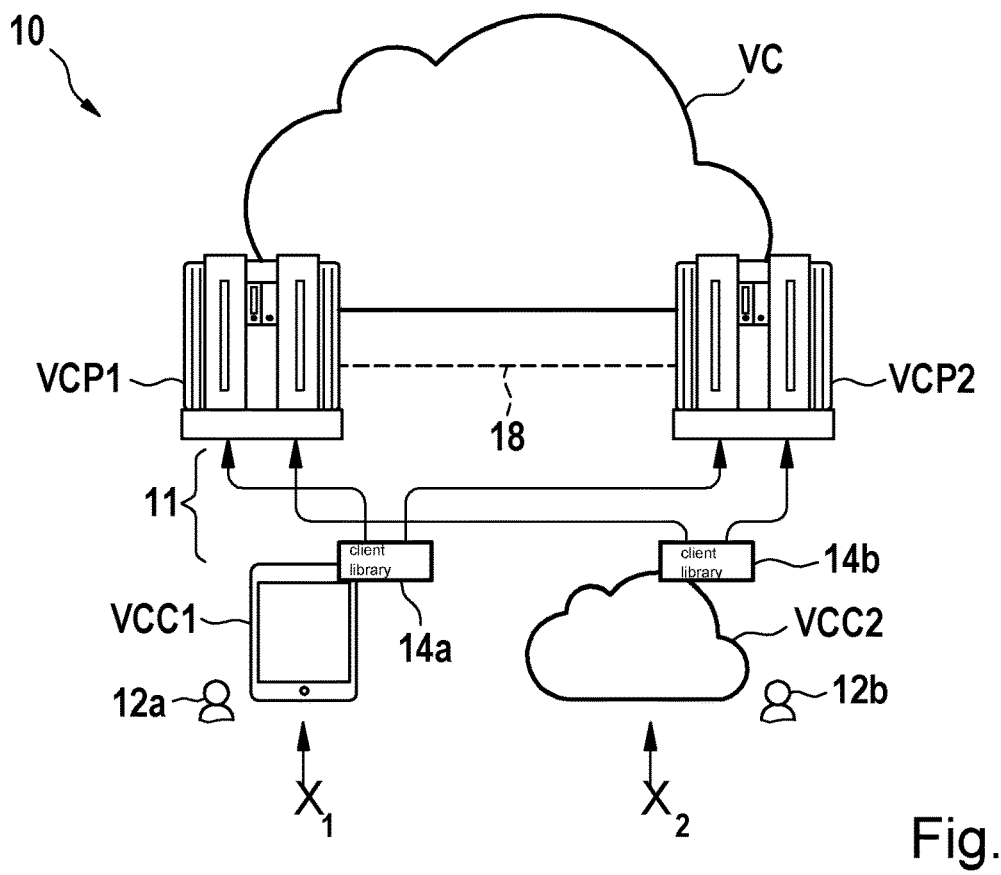
FIG. 1A schematically illustrates an example system for providing a distributed data processing service according to the second aspect of the present invention.

FIG. 1A schematically illustrates a system for providing a distributed data processing service. A first virtual cloud client VCC1 (such as, for example, a smart phone) is in the control of a first party 12a (first user). A second virtual cloud client VCC2 (for example, an "edge cloud") is in the control of a second party 12b (second user). The first virtual cloud client VCC1 is communicatively coupled (for example, via client libraries 14a and 14b and the Internet) to a first computing engine, also named a virtual cloud provider VCP1, and a second computing engine, also named a virtual cloud provider VCP2. The second virtual cloud client VCC2 is communicatively coupled (for example, via client libraries 14a and 14b and the Internet) to the second computing engine VCP2, and the first computing engine VCP1. In this specification, the term virtual cloud provider is synonymous with the term "computing engine". The first connected to the first and second virtual cloud clients via a communications network 11. In a system with a plurality of virtual cloud clients VCC and a plurality of computing engines VCP, each virtual cloud client is communicatively coupled with each computing engine via the communications network 11.

Each VCP runs an instance of the distributed data processing service.

A virtual cloud VC is established using a binding process 18 between at least VCP1 and VCP2. In an embodiment, the binding process is symmetric or peer to peer.

The virtual cloud VC provides the execution environment for pieces of software that are exposed as services. Services exposed by VCR jointly and collaboratively provided by all constituent VCPs.

Each VCP is configured to provide the service stack 20.

To invoke the distributed data processing service, VCC1 and VCC2 call each of the VC service instances on a plurality of VCPs. The protocol is encapsulated by a client library 14a, 14b and will not be elaborated on further. Optionally, the VCP1 and VCP2 infrastructures are independent. In an embodiment, a service and location is permitted only if both VCPs independently permit the indication on their local services. Data is distributed securely among the VCP using secret sharing. The distributed data processing service provided by the virtual cloud VC can operate on data stored in VCP1 and VCP2 by means of secure multiparty computation protocols.

In particular, there is provided first and second Virtual Cloud Providers VCP 1 and VCP 2 intended to host a cloud infrastructure as set out in the service stack 20 and discussed below. A skilled person will appreciate that more than two parties, clients, and VCPs may be provided. In an embodiment, each virtual cloud client VCC is connected via its associated client library 14 to each virtual cloud provider VCP.

Dependent on the type of multiparty protocol applied, different security guarantees can be inherited by the system. For example, in an embodiment, the system must not allow any coalition of VCPs to access the data as long as one VCP remains uncompromised.

Service Stack

Figure 1B:
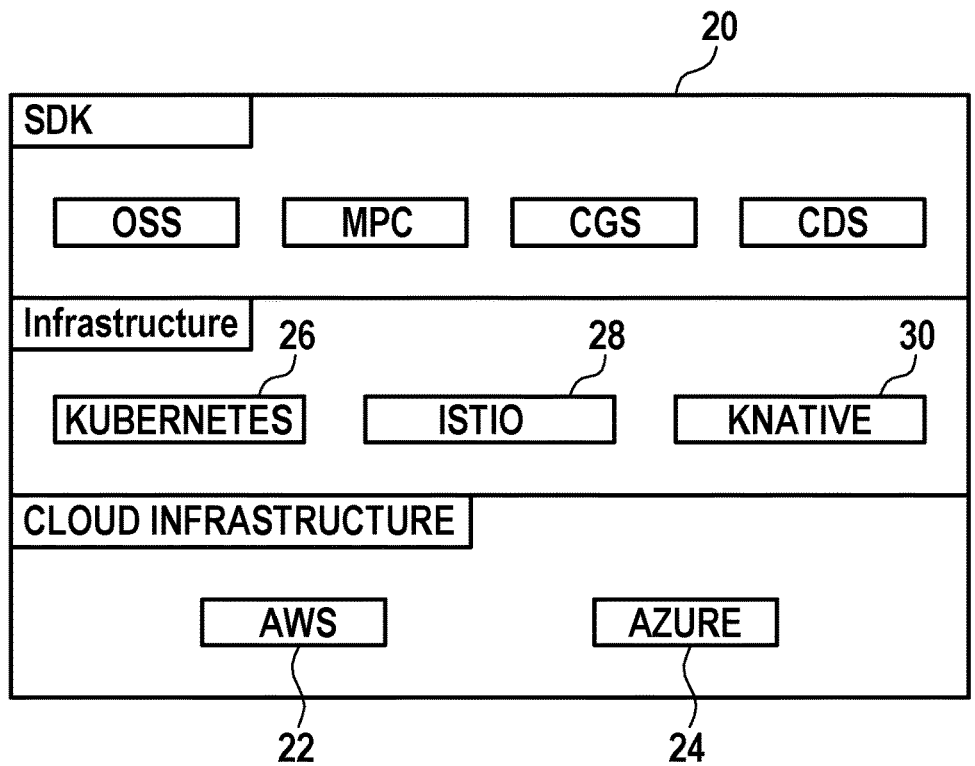
FIG. 1B schematically illustrates a service stack of a distributed data processing service.

FIG. 1B schematically illustrates a service stack 20 of a distributed data processing service.

In particular, a lower cloud infrastructure layer may, for example, be comprised of one or both of an Amazon AWS™ compute cloud or a Microsoft Azure™ compute cloud. Upon this cloud infrastructure is provided, as an example, a set of components for providing a consistent execution environment to the SDK layer, such as a combination of the Kubernetes™ framework 26 for orchestrating a reconfigurable plurality of containers intended to hold VCP1 and VCP2 at runtime, the Knative™ framework 30 for executing cloud applications, and the ISTIO™ framework for service communication and providing a communications network. Built upon infrastructure layer is an SDK layer providing the OSS, MCS, CGS, and CDS services according to the aspects discussed herein.

Figure 2:
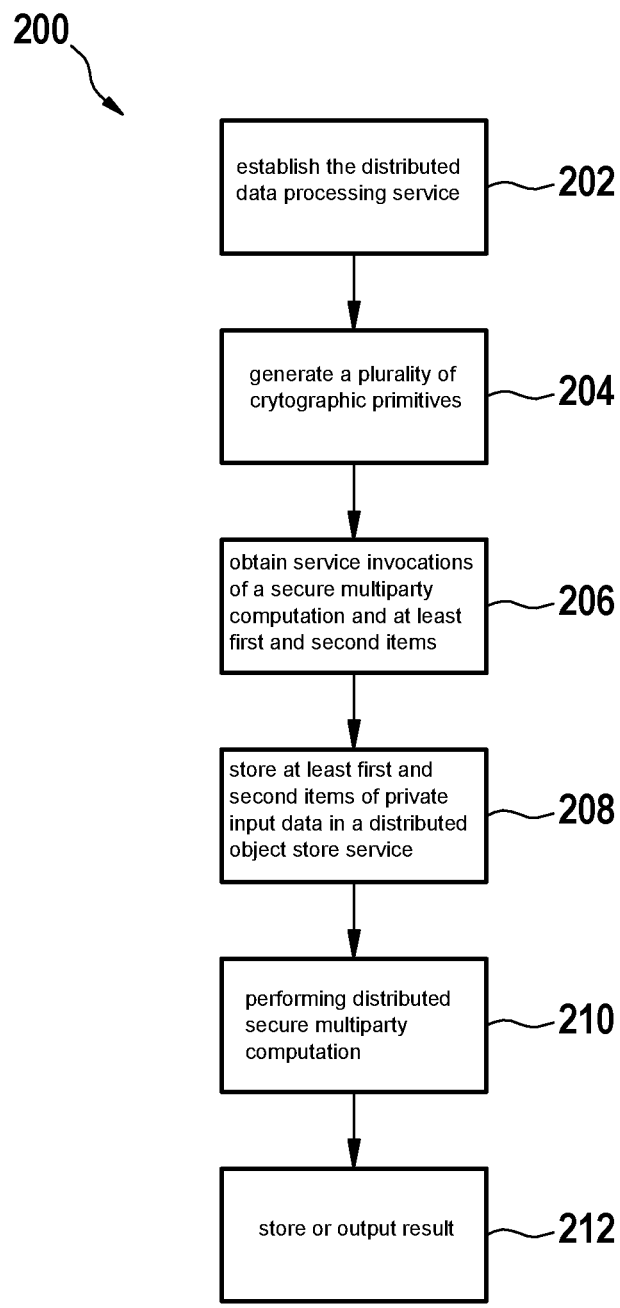
FIG. 2 schematically illustrates an example computer-implemented method in accordance with the first aspect of the present invention.

FIG. 2 schematically illustrates a computer-implemented method in accordance with the first aspect.

According to a first aspect, there is provided a computer-implemented method 200 for providing a distributed data processing service for performing a secure multiparty computation of a function on at least first and second items of private input data using at least a first and a second computing engine communicatively coupled via a communication network, the method comprising:

establishing 202, using the first computing engine, the distributed data processing service by binding at least the second computing engine to the first computing engine;

generating 204, using a distributed cryptographic generation service provided by first and second cryptographic engines managed by the corresponding first and second computing engines, a plurality of cryptographic primitives required during an online phase of the secure multiparty computation, wherein a proportion of the cryptographic primitives are generated during an offline phase prior to the secure multiparty computation, and the plurality of cryptographic primitives are stored by a distributed cryptographic data store service provided by corresponding at least first and second cryptographic data stores managed by the respective first and second computing engines;

obtaining 206, by the distributed data processing service, service invocations of a secure multiparty computation and at least first and second items of private input data;

storing 208 at least first and second items of private input data in a distributed object store service of the distributed data processing service provided by at least first and second object store engines managed by the corresponding first and second computing engines;

performing 210, during an online phase, a distributed secure multiparty computation on at least the first and second items of private input data using a distributed multiparty computation service of the distributed data processing service provided by first and second multiparty computing engines managed by the corresponding first and second computing engines, wherein the first multiparty computing engine performs the secure multiparty computation together with at least the second multiparty computing engine; and storing 212 at least one result of the secure multiparty computation via the distributed object store service, and/or outputting the at least one result to at least the first or second client.

The distributed data processing service 30 enables a plurality of VCPs to jointly establish the virtual cloud VC that offers storage and processing services that comprise multiparty computation and secret sharing in order to hide private input data submitted by clients or obtained from object store engines. The data is hidden from the other participating VCPs during storage, processing, and output.

Client Authentication Mechanism

In an embodiment, access to the resources of a distributed data processing service (30, VC) may be restricted because typically the system is a multi-tenant client/server system. The restriction is applied by using authentication and authorization mechanisms operating on each VCP.

In an embodiment, authentication can be performed using OpenID Connect.

In an embodiment, before a client VCC1 is able to consume the resources of a VCP, it fetches an access token that is used to identify the requesting party. An access token is fetched for each VCP, because using the same token for all VCPs would allow VCPs to impersonate clients.

With the access token, a client can be permitted to consume distributed data processing service 30 VC resources by submitting requests to the VCPs, including the respective access token. In an embodiment, resources are exposed by the ODS (storage), the MPC service (invocation of MPC functions), and the CDS service (cryptographic primitive storage).

In an embodiment, each resource can be accessed using different operations, e.g. up- and downloading objects. To make an access decision, Access Control Lists (ACLs), are generated consisting of tuples (user, resource, operation). Existence of such a tuple means that the operation of the resource by the requesting client is allowed. Of course, other access control mechanisms could be used as well without loss of generality (e.g. OAuth2).

Furthermore, in an embodiment, role-based access control or attribute-based access control could be employed.

In an embodiment, access control decisions are at the discretion of individual VCPs. In this case, there is no explicit consensus mechanism. However, there is an implicit one, as a client is e.g. able to reconstruct a secret only in case it is authorized to fetch the secret shares from all VCPs, or execute a function only if it can trigger the execution on all VCPs. This could be implemented in another embodiment by leveraging a distributed ledger. In an embodiment, a byzantine fault tolerant ledger that tolerates a maximum of ⅓ of the parties being dishonest in combination with SPDZ MPC protocol. In that case, although SPDZ guarantees security as long as there is at least one honest party, this does not matter as soon as more than ⅓ of the parties (=VCPs) are corrupted.

According to an embodiment, the distributed data processing service 30 for performing the secure multiparty computation guarantees that the first private input data is confidential to the first client, and that the second private input data is confidential to the second client, provided that at least one of the at least first and second computing engines remains uncompromised.

In an embodiment, the first and second items of input data are obtained from respective first VCC1 and second VCC2 clients that are communicatively coupled to the distributed data processing service 30. For example, in an auction computation two auction values are obtained from the first and second clients, respectively. The auction function is collaboratively performed by the first and second multiparty computing engines, and the winner or loser of the auction is reported to the first and second clients without exposing to each of the first and second clients what the bid of the mutually opposed client was.

In an embodiment, at least one item of input data is obtained from a persistent data record of the first object store engine OSE1. In other words, it is not essential that every computing engine VCP receives an input from a client VCC communicatively coupled to the distributed data processing service 30. The private input data can also be obtained from the object store service OSS of the distributed data processing service 30.

In an embodiment, a multiparty computation of a plurality of items of input data from a plurality of clients VCC1, VCC2 is obtained from a plurality of persistent data records of a plurality of object store engines OSE1, OSE2.

In an embodiment, the private input data can be obtained from a database (not illustrated) within, or outside of, the distributed data processing service 30. For example, at least one client VCC may communicate a lookup location to a record of the database, and the database then provides the data contained in the record as private input data.

Figure 3:
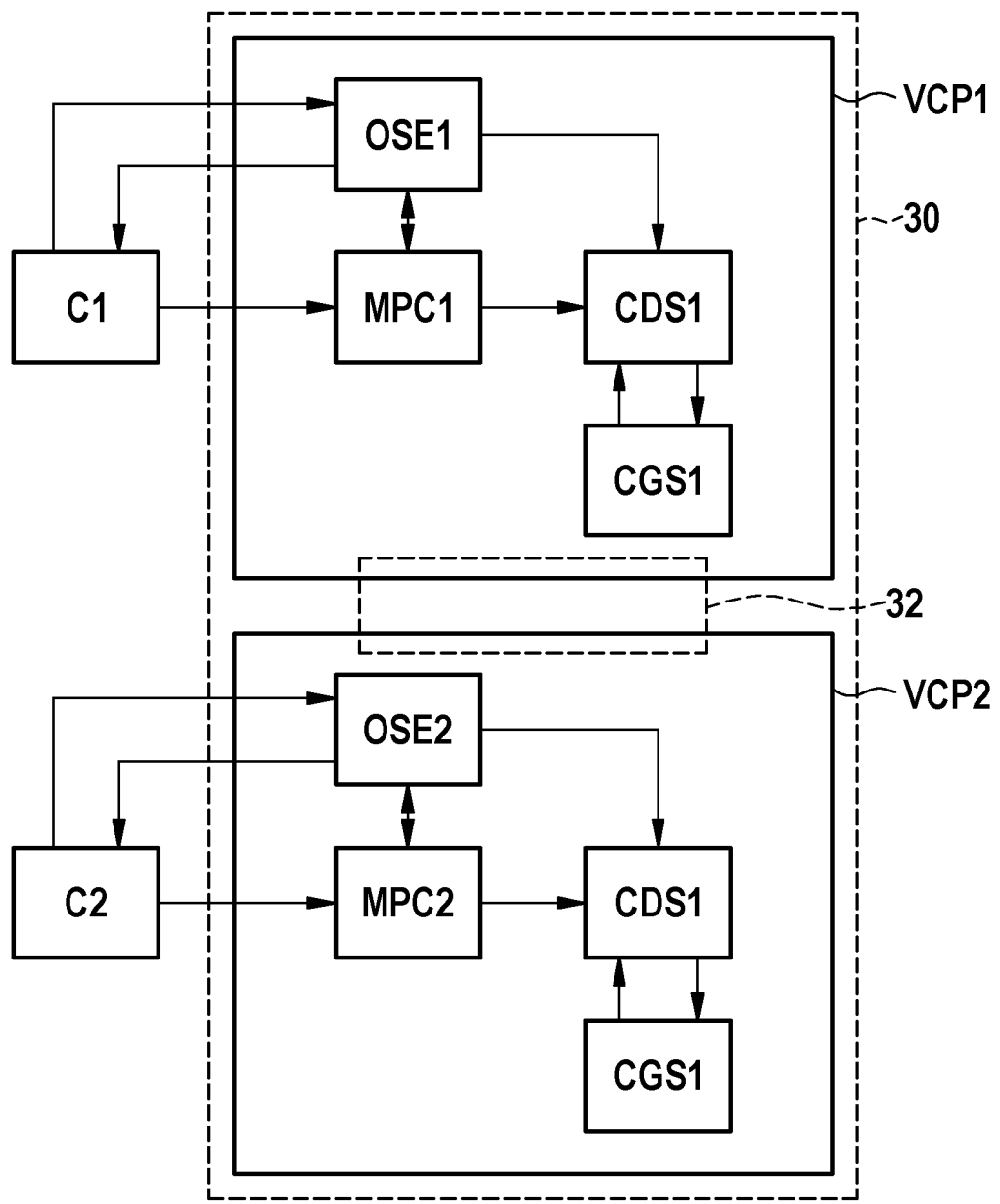
FIG. 3 schematically illustrates an overview of an exemplary distributed data processing service comprising two virtual cloud providers, in accordance with the present invention.

FIG. 3 schematically illustrates an overview of an exemplary distributed data processing service comprising two virtual cloud providers.

Each VC service is implemented jointly (in parallel) by a set of parallel local services provided by each VCP. Each local VCP is implemented using a container orchestrator (Kubernetes™), a service mesh 32 (Istio™), and a serverless computing runtime (Knative™). This enables the distributed data processing service provided by VCP 1 and VCP 2 to be scaled independently. Additionally, the services can be replicated to provide fault tolerance.

Establishing 202 the distributed data processing service 30 involves establishing a virtual cloud by binding at least VCP1 to VCP2, and vice versa.

In an embodiment, the service invocations of the secure multiparty computation are obtained from at least first and second clients, wherein the service invocations comprise at least first and second items of private input data. For example, the service invocation comprises object identifiers of elements in the cryptographic data store CDS. Alternatively, or in addition, the service invocation may originate from the first VCP1 or second VCP1 computing engine within the distributed data processing service 30. In an embodiment, the service invocation originates from at least one multiparty computation engine MPC1, MPC 2.

VCP1 and VCP2 pre generate cryptographic primitives providing correlated randomness using a cryptographic mechanism such as homomorphic encryption, or oblivious transfer. The correlated randomness is used subsequently to enable secure and fast I/O operations between the multiparty computation engines MPC1, 2 and the object store engines OSE 1, 2.

Subsequently, clients register and authorise with the VC to qualify for invoking services provided by the VC such as the upload or download of private data, and to trigger computations.

In an embodiment, the cryptographic generation service CGS1, 2 is configured to monitor the cryptographic data store service CDS1, 2 to monitor the availability of at least one type of cryptographic primitive. The cryptographic generation service CGS1, 2 is configured to generate at least one type of cryptographic primitive and to store it in the cryptographic datastore service.

A first client VCC1 may store or read private data from a first object store engine OSE1. The first object store engine OSE1 is configured to obtain input masks from the cryptographic datastore service CDS1. The first client C1 may trigger an execution by signalling to the multiparty computation engine MPC1. The first multiparty computation engine MPC1 reads cryptographic primitives from the cryptographic data store CDS1 in synchrony with obtaining object data from the object store engine OSE1. The first multiparty computation engine MPC1 communicates to the second multiparty computation engine MPC2 in VCP2, enabling analogous computation in MPC2 to be synchronized. In an embodiment, at the conclusion of a computation, MPC1 and MPC2 write their respective results to respective object store engines OSE1 and OSE2. In an embodiment, at the conclusion of a computation, identifiers of OSE objects that contain the results of the computation are communicated to one or more clients that triggered the multiparty computation. In an embodiment, at the conclusion of a computation, the results of the computation are communicated to one or more clients that triggered the multiparty computation. Subsequently, the private result of the computation is communicated to the respective clients C1 and C2.

In an embodiment, objects are stored in the first and second object store engines OSE1, 2 in shared secret form.

In an example, objects stored in the first and second object store engines OSE1, 2 are immutable, but may be annotated using public tags.

In an example, private results are stored within the object store engines OSE1, 2. In an example, private results are returned to respective client directly after the computation using MPC1, 2.

Distributed Data Processing Service

Figure 4:
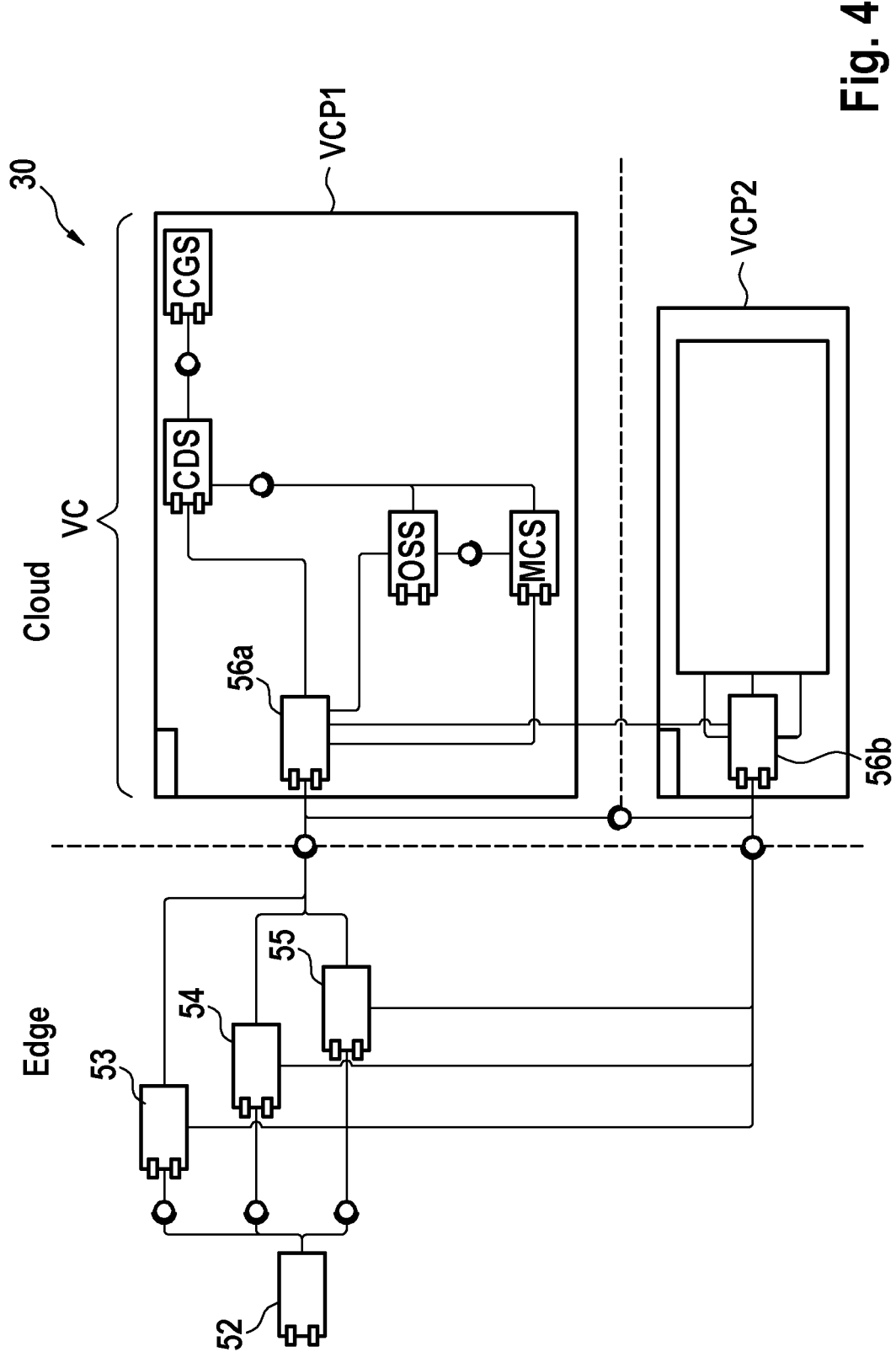
FIG. 4 schematically illustrates a distributed data processing service, in accordance with an example embodiment of the present invention.

FIG. 4 schematically illustrates a distributed data processing service 30.

In FIG. 4, the distributed data processing service 30 is illustrated using the "microservice" design pattern. A command line interface 52 interfaces with a first edge client 53 of the object store service, a second edge client 54 of the distributed multiparty computation service, and a third edge client 55 of the distributed cryptographic data store service. Optionally the interface between the edge client and the virtual cloud VC comprising the first computing engine VCP1 and the second computing engine VCP2 is performed using a REST/HTTPS interface. Optionally, VCP1 and VCP2 are Kubernetes™ containers.

Optionally, communication interfaces 56a, 56b on the cloud side comprise ISTIO services.

The first computing engine VCP1 comprises an instance of a distributed multiparty computation service (MCS), communicatively coupled to the distributed cryptographic datastore service CDS and the distributed object store service OSS using, for example, REST/HTTPS interfaces, although other signalling formats may also be used. The distributed cryptographic datastore service CDS is communicatively coupled to the distributed cryptographic generation service, also optionally using a REST/HTTPS interface. Analogous communication connections are made within the cloud VC to the second computing engine VCP2, optionally via a cross-VCP API. Of course, the microservices illustrated in FIG. 4 may optionally depend on additional services such as RDBMS, K/V, and security credential stores which have been omitted for the sake of clarity.

According to an embodiment, establishing 202 the distributed data processing service comprises instantiating a virtual cloud comprising at least the first and second computing engines, and/or binding at least the second computing engine to the first computing engine comprises establishing and exchanging initial cryptographic primitives to establish at least one authenticated communication channel between the at least first and second computing engines, wherein the initial cryptographic primitives optionally comprise one or more homomorphic keys or a shared message authentication code, MAC, key.

The at least one authenticated communication channel may be established, for example, by the exchange of public key certificates used to authenticate inter-VCP communication channels.

In more detail, the object store service of the distributed data processing service 30 is configured to persist data within the virtual cloud VC as secret shares across all virtual cloud providers VCPs (computing engines). In an embodiment, the object store service integrates with the distributed cryptographic datastore service to implement special-purpose cryptographic protocols for secure data upload and/or download.

In an embodiment, the object store service provides means for storing any number of objects of an arbitrary size. In an embodiment, the object store service allows meta data to be attached to objects stored therein. Optionally, meta data objects may be stored in non-shared clear text form. Meta data may be attached to objects using tags consisting of key/value pairs. Tags can be used for server-side filtering of objects. Optionally, the tags are stored in clear text and thus not secret shared, but still are replicated among every VCP comprised within the distributed data processing service 30 (virtual cloud). Optionally, if a tag is inconsistent across VCPs, it is omitted when tags are fetched for an object. Optionally, tag data is stored in a SQL database.

The object store service is configured to encrypt data at rest, and furthermore is configured to implement secure data upload and download protocols. In an embodiment, the object store service exposes a REST API that can be consumed by clients of the distributed data processing service 30 over HTTPS.

The secure upload and download of secret shares necessitates the use of protocols to ensure that VCPs (computing engines) cannot derive information about the uploaded or downloaded secrets. Accordingly, the object store service is configured, in an embodiment, to connect to the distributed cryptographic datastore service whenever a secret share upload or download is performed.

In more detail, the distributed cryptographic data store service is a specialised storage service for correlated random cryptographic material (primitives) called tuples previously generated by the distributed cryptographic generation service.

In an embodiment, cryptographic primitives (such as tuples) are subsequently consumed by the distributed object store service when performing a secure object upload or download. Cryptographic primitives are also consumed when the multiparty computation is performed.

In an embodiment, the master CDS1 of the cryptographic datastore engine is configured to perform online coordination across all computing engines VCPs according to a master/slave approach. When an operation is performed where a cryptographic primitive is involved, the distributed cryptographic datastore service is configured to deliver corresponding cryptographic primitive shares to the requesting service.

In an embodiment, the distributed cryptographic datastore service is configured to deliver cryptographic primitives in batches of arbitrary size. In the embodiment, other services are configured to fetch correlated cryptographic primitives (such as correlated triples) for a specific coordinated action among at least the first VCP1 and second VCP1 computing engine in the distributed data processing service.

In an embodiment, the distributed cryptographic datastore service exposes cryptographic primitive telemetry data such as the current availability of a type of cryptographic primitive, and the current consumption rate of a type of cryptographic primitive. Other services may read the cryptographic primitive telemetry data. Optionally, if the multiparty computation service identifies that there are not enough of a certain type of cryptographic primitive to successfully begin or complete a given multiparty computation, the multiparty computation service will wait for a predetermined period of time and signal to the distributed cryptographic generation service to generate more cryptographic primitives of the required type. Optionally, if the multiparty computation service identifies that there are not enough of a certain type of cryptographic primitive to successfully begin or complete a given multiparty computation, the multiparty computation service is configured to abort the calculation.

In an embodiment, the distributed cryptographic datastore service encrypts cryptographic primitives when they are at rest. In an embodiment, the distributed cryptographic datastore service is configured to deliver cryptographic primitives to two, up to five, up to ten, up to fifty, up to one hundred, or an arbitrary number of processor cores simultaneously.

According to an embodiment, the distributed data processing service for performing a secure multiparty computation of a function applies one of the SPDZ protocol, in particular the Fresco implementation, or the scale mamba implementation.

According to an embodiment, the at least first and second computing engines providing portions of each of the distributed cryptographic generation service, the distributed cryptographic data store service, the distributed object store service, and the distributed secure multiparty computation service are implemented using a container orchestration-based service optionally comprising Kubernetes™, Mesos™, or Docker Swarm™.

Distributed Discovery Protocol

Figure 5:
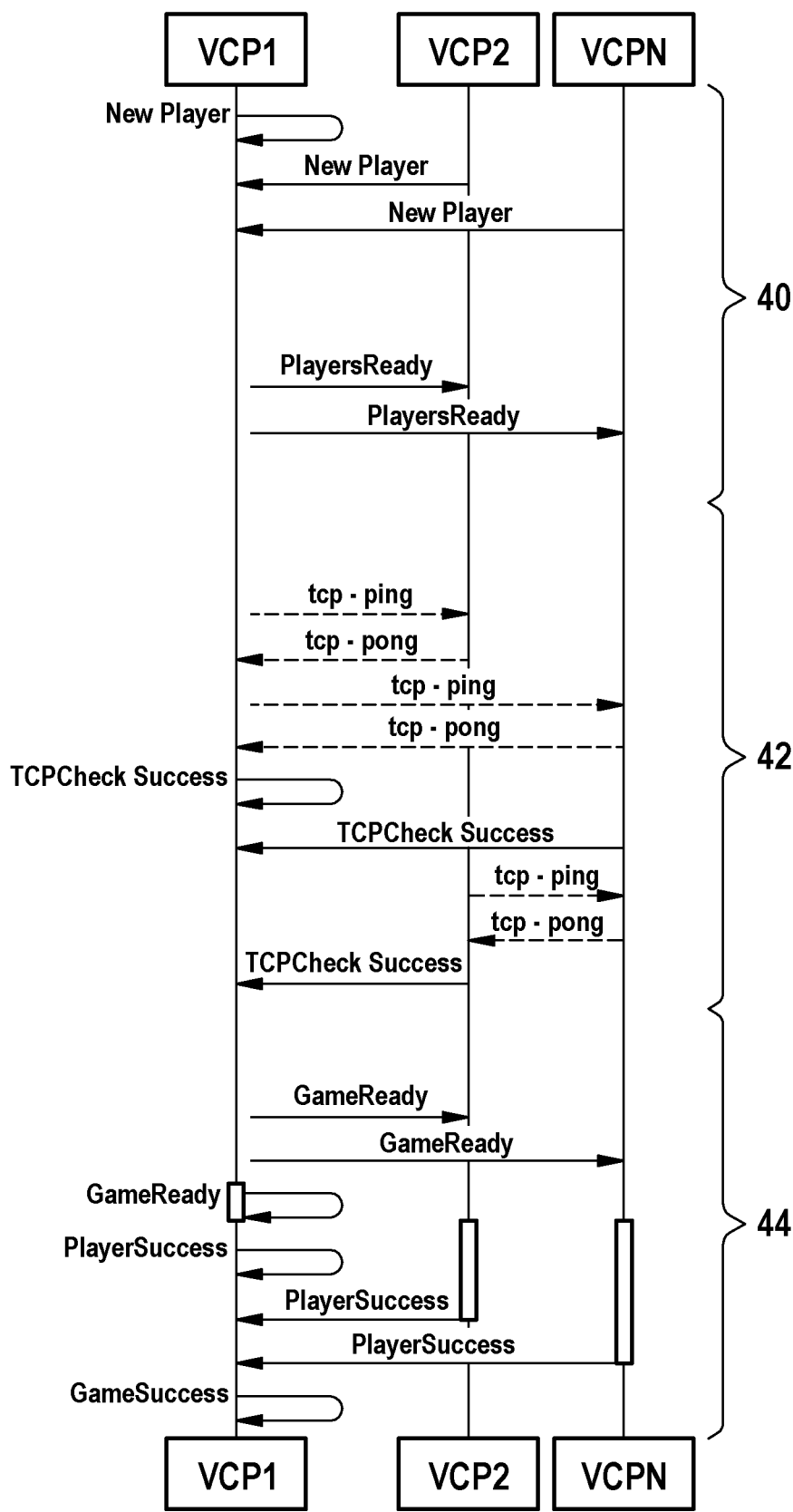
FIG. 5 schematically illustrates an example of a VC computation execution protocol, in accordance with an example embodiment of the present invention.

FIG. 5 schematically illustrates an example of a MPC computation protocol between three VCPs, although the protocol also functions in the case of two or more VCPs.

According to an embodiment, there is further provided performing a discovery process after establishing the distributed data processing service, wherein the discovery process comprises:

orchestrating, via the first multiparty computing engine. MPC1, a discovery protocol to identify the presence of at least a second multiparty computing engine MPC2 in the virtual cloud and a communication endpoint identifier of the second computing engine and/or the second multiparty computing engine;

establishing, a communication channel to communicatively couple the first multiparty computing engine (MPC1) to at least the second multiparty computing engine MPC2; and orchestrating, via the first multiparty computing engine, a secure multiparty computation using at least the first and second multiparty computing engines communicating over the communications channel.

For example, all VCP MPC services participating in the computation register themselves as "players" for the MPC execution, called a "game". In this game, VCP1 performs the role of master. VCP2 and VCPN perform the role of slave.

In a first phase 40, the players register themselves with their corresponding network endpoints made available in a network setup phase (signal "NewPlayer").

In an embodiment, the network setup phase is performed by Istio virtual services. The Istio virtual services provider exposes multiparty computing engine endpoints to the network. As soon as all N VCPs in a N VCP VC have registered, the master announces that all players are ready (signal "player ready"). The endpoint identifier may be, for example, a TCP socket, as defined by a network address and a port number, for example. However, any other address format capable of identifying the VCP may be used.

In a second phase 42, a mutual reachability check is performed. In particular, this is necessary because the MPC engines of VCP1, VCP2, and VCPN are started asynchronously and will fail if the other parties are not reachable. The mutual reachability check may, in an example, comprise a TCP-based "ping" protocol. As soon as all parties sending a TCP "ping" to the partner players have received a corresponding "pong" message ("TCPCheckSuccess"), mutual network connectivity between all players may be considered to have been verified.

In a game execution phase 44, the master VCP1 announces the game to be ready for execution (signalling "GameReady"). The MPC engines perform the execution of the MPC computation. After each successful termination of an MPC program in a corresponding VCP, the respective VCPs signal to the master VCP1 signal "PlayerSuccess". In an example, the "PlayerSuccess" signal implies that the multiparty computation has been performed with no security compromises, which would otherwise have been identified using the SPDZ algorithm.

The master then announces to the distributed data processing service 30 "GameSuccess", signalling successful execution of the game. In an embodiment, the network setup may be kept alive for reuse during subsequent executions, thus reducing signalling overhead in repetitive MPC computations.

Distributed Cryptographic Generation Service (CGS)

Figure 6:
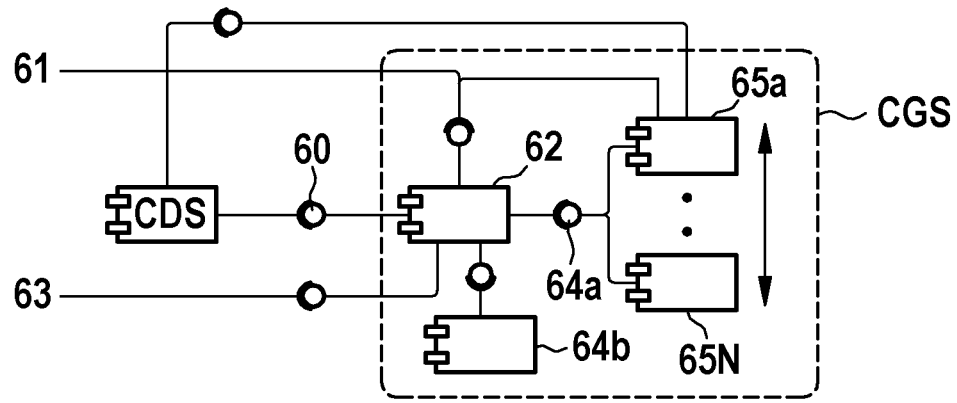
FIG. 6 schematically illustrates an example of a cryptographic generation service, in accordance with the present invention.

FIG. 6 schematically illustrates an example of a distributed cryptographic generation service CGS using the "microservice" design pattern.

The purpose of the distributed cryptographic generation service CGS is to securely generate cryptographic primitives (for example, multiplication triples or input masks) having correlated randomness in cooperation with at least first VCP1 and second VCP2 computing engines (virtual cloud providers), and to provide them to the distributed cryptographic datastore service CDS for subsequent consumption by the distributed object store service OSS (when reading and writing data to or from the service mesh of a VCP, or the distributed multiparty computation service MCS). When the CGS has generated cryptographic primitive, it should be uploaded to the CGS. The CGS is capable of generating at least all different types of triples required for a SPDZ protocol employing secret sharing.

According to an embodiment, there is further provided:
monitoring, via a load monitor of the distributed cryptographic generation service, a present or anticipated computational load on one or more of the distributed cryptographic generation service, the distributed cryptographic data store service, the distributed object store service, and the distributed secure multiparty computation;

if the load monitor determines that the present or anticipated computational load exceeds, or will exceed, an upper load threshold:
instructing a container orchestrator to increase the number of containers providing one or more of the distributed cryptographic generation service, the distributed cryptographic data store service, the distributed object store service, and the distributed secure multiparty computation, as appropriate; and/or if the load monitor determines that the present or anticipated computational load falls below, or will fall below, a lower load threshold:
instructing a container orchestrator to reduce the number of containers providing one or more of the distributed cryptographic generation service, the distributed cryptographic data store service, the distributed object store service, and the distributed secure multiparty computation, as appropriate.

In an embodiment, the CGS comprises a controller instance 62.

The CGS is configured to perform a cryptographic primitive generation job (or tuple generation job). Such a job describes what cryptographic primitive types should be generated, and in what number. Each job has a unique identifier. The jobs may be equally sized to allow the generators 65a, 65n to be scaled a number dependent on the job queue length. Optionally, jobs are created by the controller instance 62 and consumed by generators 65a, 65n.

The controller instance 62 is responsible for controlling the generators 65a, 65n of a CGS. In an example, jobs are added to the queue by the controller instance 62, and removed from the queue in FIFO order by the generators 65a, 65n, although other schemes may be applied. In the virtual cloud context, one local instance of the controller 62 on a first compute engine VCP1 is configured as a master. The process of adding cryptographic generation jobs to the queues throughout the virtual cloud (for example, in slave VCPs such as the second compute engine VCP2) is performed by the master, thus requiring control communication between the local control instances of the local cryptographic engines.

In an example, the controller instance 62 of the cryptographic engine CGS of the compute engine VCP1 configured as a master periodically obtains a level of available cryptographic primitives in the distributed cryptographic data store service. Optionally, the master controller instance 62 periodically fetches an extraction rate of the cryptographic primitives. Optionally, the extraction rate and/or the level of available cryptographic primitives across one or more tuple types. The master controller instance 62 generator function that returns a set of cryptographic primitive generation jobs to be added to the FIFO. Optionally, the master controller instance 62 follows a predetermined cryptographic primitive generation strategy. Optionally, the job queue is stored in a database 64b enabling replication of the master controller instance 62 for improved fault tolerance. In an example, the master controller instance 62 initiates consistent queue updates on slave control instances of cryptographic engines within the virtual cloud after the master controller instance 62 has computed the job to be added to the job queue.

In the example, the master controller instance 62 is configured to select unique identifiers for newly created jobs. The unique identifiers are propagated across the virtual cloud. The identifier is used as the chunk identifier for identifying cryptographic primitives generated according to a given job for later upload to the cryptographic datastore service across the virtual cloud.

If the CGS detects, via a telemetry API 60 connecting to the CGS, that an upper limit of cryptographic primitives of a given cryptographic primitive type has been reached in the CGS, then the CGS pauses generation of cryptographic primitives.

In an embodiment, the MAC key share of a local VCP CGS service is used to generate the cryptographic primitives.

According to an embodiment, there is further provided:
generating, via the distributed cryptographic generation service, a plurality of cryptographic primitives of a first type and a plurality of cryptographic primitives of a second type, wherein the types are optionally selected from the group of: input masks, multiplication triples, Beaver triples, random bits, and/or square triples.

In an embodiment, the CGS adapts automatically to varying demand for cryptographic primitives to ensure that execution of the MPC routine in the MCS is not blocked owing to a lack of cryptographic primitives. In an embodiment, the CGS is exclusively used to generate cryptographic primitives in an off-line phase of the MPC routine, such as the SPDZ algorithm.

In an embodiment, the load monitoring steps described above are performed by the controller instance 62. In an embodiment, the CGS comprises a job queue API 64a and an associated job queue database 64b. In an embodiment, the CGS comprises one or more cryptographic engines 65a, 65n. Optionally, the number of cryptographic engines is scaled based on the length of the job queue.

In an embodiment, the CGS communicates 61 with remote cryptographic engines. In an embodiment, the CGS communicates 63 with remote computing engines VCP2.

Distributed Cryptographic Data Store Service

Figure 7:
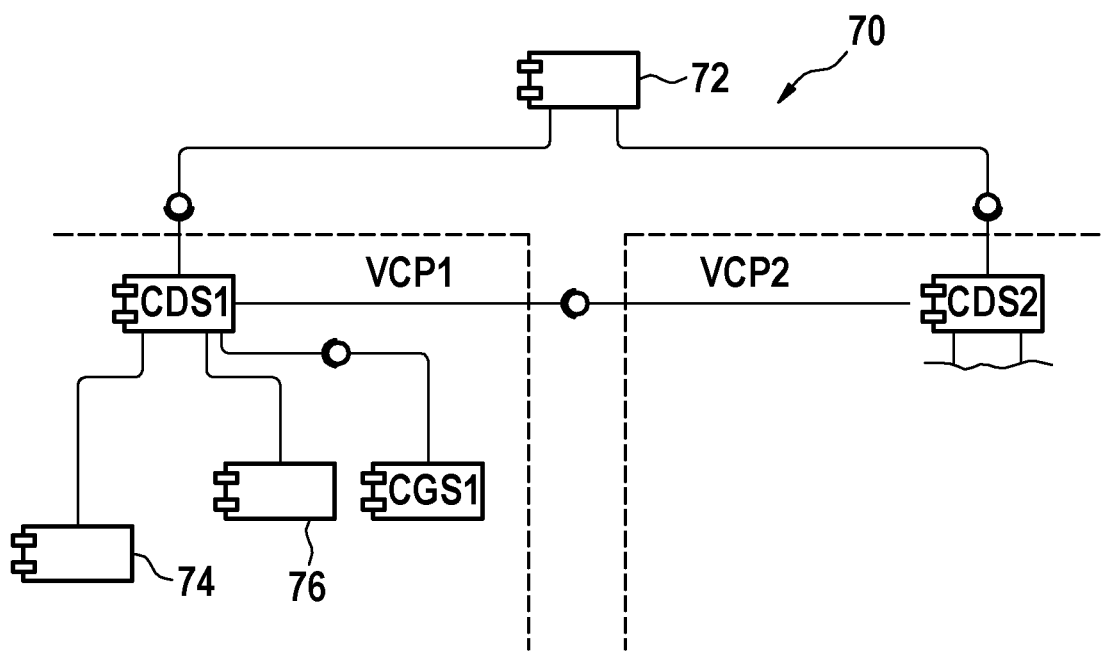
FIG. 7 schematically illustrates an example of a distributed cryptographic data store service, in accordance with the present invention.

FIG. 7 schematically illustrates an example of a distributed cryptographic data store service 70, CDS.

In an example, the distributed cryptographic datastore service 70 exposes a RESTful API that can be consumed by clients over HTTPS. The API provides REST resources for various cryptographic primitive types.

The distributed cryptographic data store service 70 is, in an example, accessible via a client API 72. Cryptographic primitive delivery should be coordinated across the distributed cryptographic datastore service in the virtual cloud VC to ensure consistency. To achieve this, one cryptographic data store CDS1 is designated as a master. This master service is responsible for selecting cryptographic primitives to be delivered to a requesting party (like a client connected to the VC) or the distributed multiparty computation service. The delivery of cryptographic primitives is a multistep process.

Initially, the master service CDS1 selects a chunk of cryptographic primitives (tuples). In an example, the chunk may be a sequence of triples, as they are stored in storage backend. Subsequently, the master service CDS1 marks the sequence of cryptographic primitives as reserved. Next, the reservation data (for example, object store locations) are broadcast to all slave CDS services (like CDS2). Having received the reservation data of the sequence of cryptographic primitives reserved in the master CDS1, the at least one slave CDS2 attempts to reserve matching cryptographic primitives.

In the case that the attempts to reserve the chunk in all slave services succeeds, the master CDS1 delivers the cryptographic primitives to the requesting service, and signals the slave services CDS2 to do the same. If the attempt to reserve the chunk as instructed by the master CDS1 fails in one or more of the slaves CDS2, the process is aborted. Optionally, the process may be retried a defined number of times. Optionally, if none of the retries are successful, the process is aborted, and an error message is sent to the requesting party.

In an embodiment, if more cryptographic primitives are requested by a party than fit into a single chunk, the same process is used, with the difference that a plurality of cryptographic primitive chunks are reserved.

In an embodiment, if a request is entered by a party for fewer cryptographic primitives than fit into a chunk, the chunk is supplemented with a marker designating how many cryptographic primitives in a chunk of cryptographic primitives have been reserved and/or consumed.

In an embodiment, a cryptographic primitive present in a first computing engine VCP1 is associated with the same unique identifier consistently across cryptographic primitives present in a second computing engine VCP2, or all computing engines in the distributed data processing service.

In an embodiment, a collision may be detected. In other words, the CDS of a slave computing engine VCP2 may already comprise a cryptographic primitive chunk with the intended identifier. In this case, the relevant chunks in the CDS of the slave computing engine VCP2 are optionally discarded, and an error message is optionally delivered to the requesting client.

Cryptographic primitive chunks are optionally stored in a storage backend 74. In an embodiment, the storage backend 74 is compatible with AWS S3™. Alternatively, cryptographic primitive chunks may be stored in a private cloud object storage server such as "Minio"™. Therefore, the distributed cryptographic generation service (CGS) inherits the high availability, durability, and scalability of the external cloud service.

In the case that Minio is used as the backend for storing the cryptographic primitive chunks, the distributed cryptographic datastore service (CDS) may apply qualities such as erasure coding and/or better detection for durability of the cryptographic primitive chunks. Optionally, public cloud object stores such as Google Cloud Storage™ or Azure Blob Storage™ can be used as storage backends.

In embodiment, at least one cryptographic data store CDS1 comprises a load monitor configured to increase or decrease a number of compute instances available to the cryptographic datastore service CDS based on a current or anticipated need.

According to an embodiment, there is further provided:
monitoring, at the first cryptographic engine managed by the first computing engine, a level of cryptographic primitives stored, respectively, in the at least first and second cryptographic data stores;
generating, at the first cryptographic engine, one or more cryptographic primitive generation schedules based on the level of stored cryptographic primitives across at least the first and second cryptographic data stores;
distributing the one or more cryptographic primitive generation schedules to at least the second cryptographic engine; and
generating a first plurality of cryptographic primitives using the first cryptographic engine in synchrony with a second plurality of cryptographic primitives using the second cryptographic engine in accordance with the one or more cryptographic primitive generation schedules.

The distributed cryptographic generation service (CGS) comprises a telemetry service 76 configured to transmit information about the remaining number of cryptographic primitives (optionally, per type of cryptographic primitive, and including the consumption rate) to the distributed cryptographic generation service CGS. Alternatively, the distributed cryptographic generation service CGS monitors the cryptographic primitives remaining in each cryptographic data store CDS1, 2 . . . . In an embodiment, the cryptographic primitives are generated and uploaded to the distributed cryptographic datastore service (CDS).

Cryptographic Primitive Distribution

For any operation that requires cryptographic primitives (tuples), like secret sharing, up- and downloading secrets or performing MPC operations, the cryptographic data store service CDS supported by the respective plurality of VCPs needs to deliver corresponding tuple shares generated by the cryptographic generation service CGS to the requesting service.

In an embodiment, CDS performs online coordination across all VCPs using a master/slave approach. Tuples are stored as secret shares (also referred to as tuple shares in the following) across all Virtual Cloud Providers (VCPs) in a Virtual Cloud (VC). In the CDS, tuple shares are stored within so called "TupleChunks", containing one to many tuple shares. The interface of a CDS to its host VCP is a CDS client.

Figure 10:
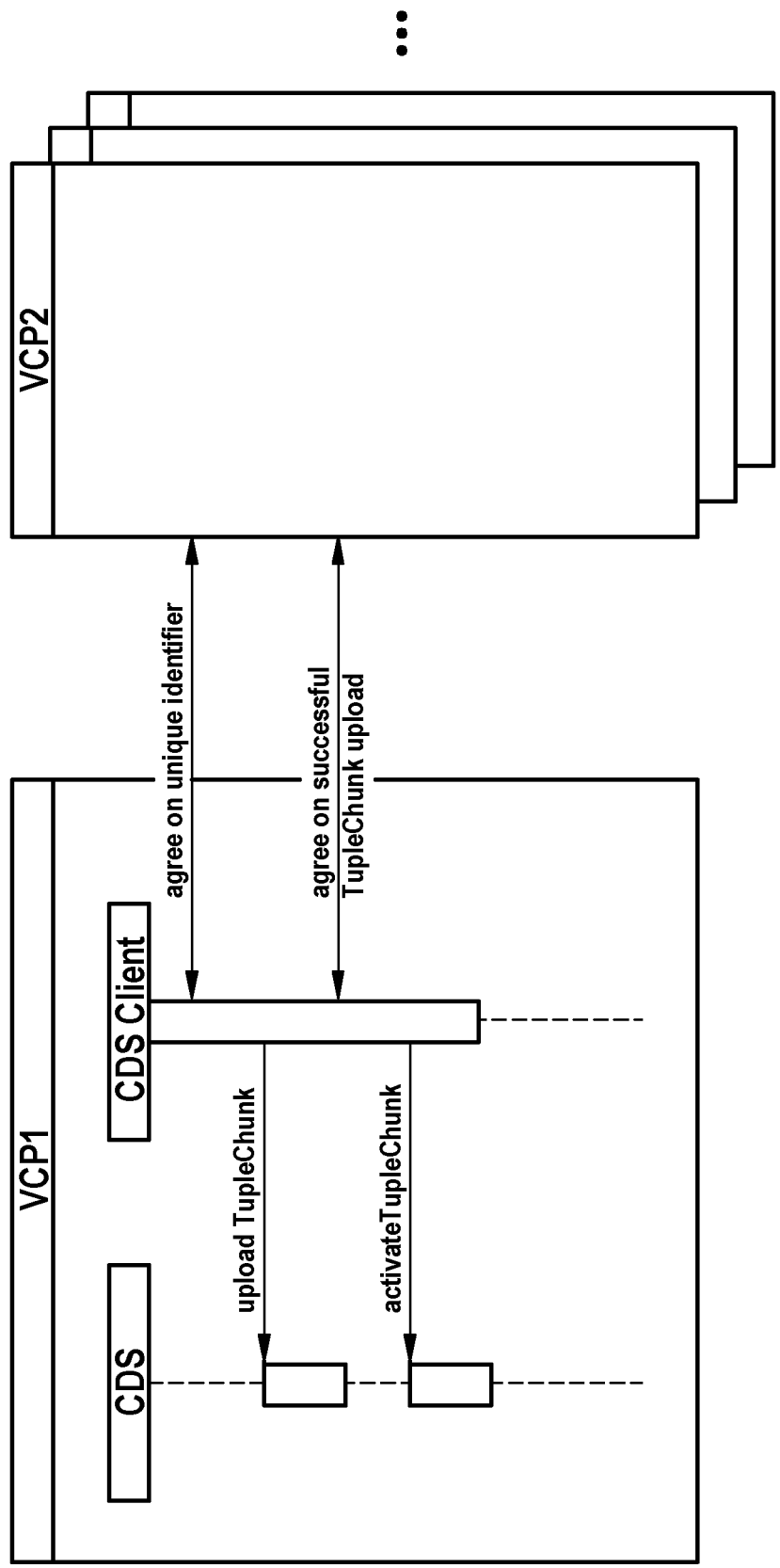
FIG. 10 schematically illustrates a summary of a cryptographic primitive distribution scheme, in accordance with the present invention.

FIG. 10 schematically illustrates a summary of a cryptographic primitive distribution scheme.

When uploading a set of tuple shares (a new TupleChunk), the CDS clients in all VCPs of the VC that hold a share of the same set of tuples may agree on an identifier before uploading to their individual CDS. In an embodiment, an identifier may be an instance of 128-bit UUId Type 4, although other formats may be applied.

The identifier is used to match the distributed TupleChunks that belong to the same set of tuples across the VCPs, and therefore is identical for each of the related TupleChunks but unique within each of the single VCPs' CDS.

Upon receiving a TupleChunk provisioning request, each CDS client transmits the identifier, the actual tuple shares in the respective CDS client, and the type of the tuples that are transmitted.

Initially, a newly received TupleChunk is stored with a status called inactive, which will prevent the tuples of the given chunk being consumed.

In order to activate a given TupleChunk, all VCPs have to agree that each of the VCPs has received their individual TupleChunk of the related set of tuples.

Then, the CDS clients have to send a status update request for the TupleChunk with the specific ID, and set the status to activated (for example, by setting a cryptographic primitive status flag), in order to make the contained tuple shares available for later usage. Accordingly, the TupleChunks are activated only when the individual TupleChunks of all VCPs have been uploaded successfully.

Within the CDS, the status of a TupleChunk is stored separately from the actual tuple share data in a metadata object. This metadata also holds additional information such as which type of tuple is stored, how many tuple shares are stored within the chunk, which tuple shares in the given TupleChunk have already been used, and which tuple shares have already been allocated for future usage.

When downloading tuple shares from the CDS, the CDS in each VCP perform a process to agree on a request identifier, optionally again an instance of 128-bit UUId Type 4 in the present exemplary implementation, and the number of tuples to be fetched. In this example, the requests are sent as HTTP(S) requests to the respective CDS service.

The VCPs are configured to return the corresponding tuple shares in the right order.

Therefore the CDS master in the associated master VCP is configured to generate a "TupleReservation" object and then to share it with the slave CDS instances as HTTP(S) requests. The TupleReservation is identified by the same identifier as used for the initial tuple share request by the client. This makes sure that the same identifier is used across all the VCPSs. The reservation contains information about which tuple shares of the individually stored TupleChunks will be returned for the given request. However, only activated TupleChunks will be used for this purpose.

In the same way, TupleReservations are initially stored as inactive and are activated once the master service can successfully share the TupleReservation with all of the VCPs. Additional internal measures, such as marking the TupleReservations as reserved, ensure that all tuple shares which have been referenced by such a TupleReservation will not be referenced by any other TupleReservation, and therefore be reused. The CDS clients have to wait for this process to happen in the background before any tuple shares are be returned. Before the requested tuple shares have been sent to the client, the corresponding sections of the stored TupleChunks will be marked as having been consumed internally.

Figure 11:
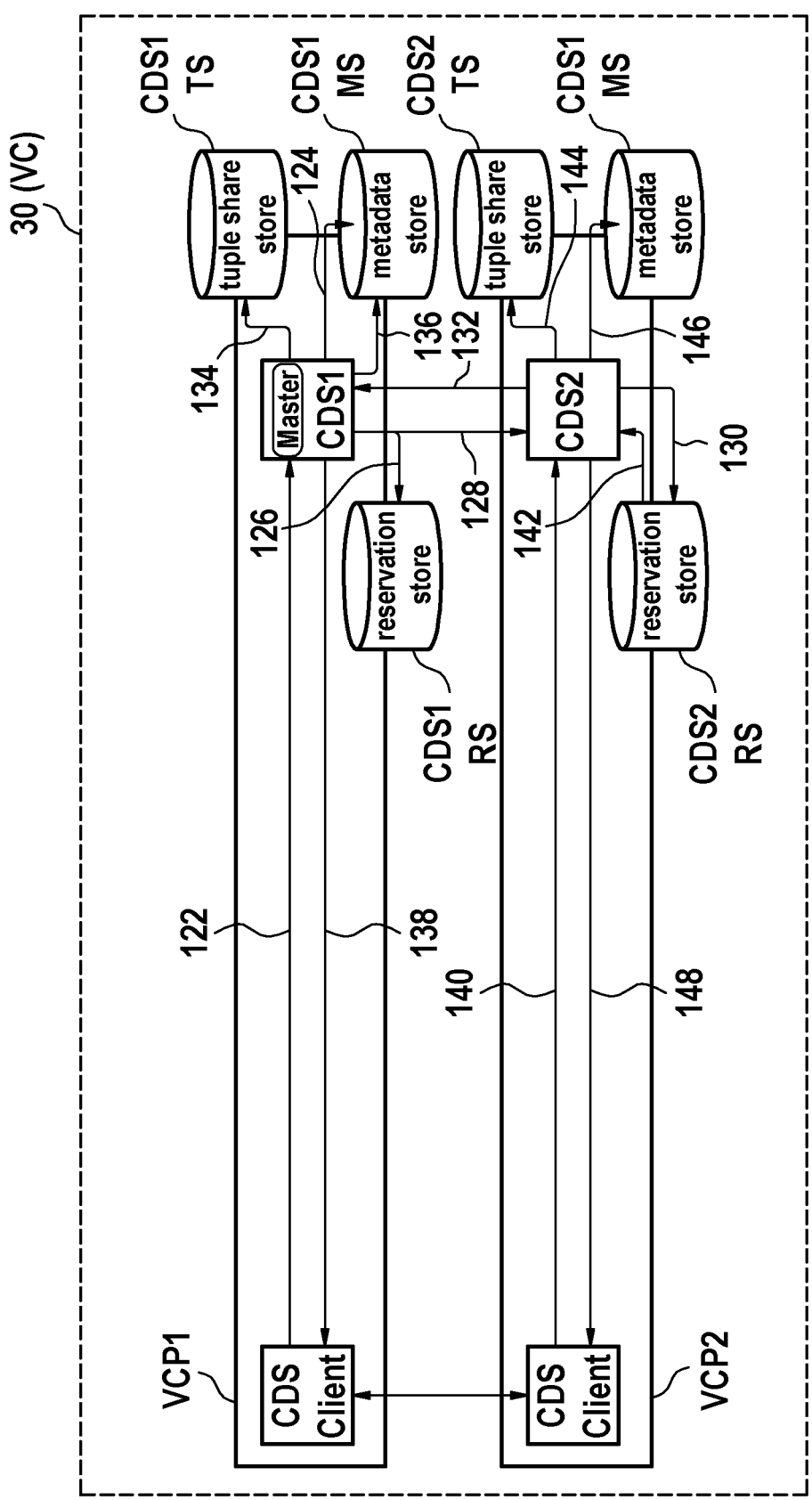
FIG. 11 schematically illustrates a sequence of operations during a cryptographic primitive distribution operation, in accordance with the present invention.

FIG. 11 schematically illustrates a sequence of operations during a cryptographic primitive distribution operation. Although a cryptographic primitive distribution operation between two computing engines VCP1 and VCP2 is illustrated for simplicity, a skilled person will appreciate that the cryptographic primitive distribution operation can be performed with three, four, five, six, or more VCP participants.

In FIG. 11, the cryptographic data store services CDS1, 2 are illustrated, an example, as interfacing a cryptographic primitive share store CDS1,2 TS, a reservation store CDS1,2 RS, and a metadata store CDS1,2 MS. A skilled person will appreciate that this is one storage architecture out of many that may be applied.

A typical cryptographic primitive share operation (secret share operation) between first and second computing engines VCP1, VCP2 will now be described with reference to FIG. 11.

Initially, at step 120, the first and second CDS clients in respective first and second computing engines VCP1, VCP2 agree on a unique request identifier. In a first option, the clients are outside the VCPs, such as comprised in a smartphone VCC1 or the edgecloud VCC2. In this first case, both clients are contacted from the same caller a common identifier may be agreed. In a second case, a number of the clients are considered to be within the VCPs. In this case, the identifier is derived from the identifier of the execution for which the tuples are needed.

At step 122, the CDS client in the first computing engine VCP1 issues a tuple request from the first cryptographic data store CGS1 of the first computing engine VCP1 acting as a master.

At step 124, the cryptographic data store CDS1 updates the meta data store CDS1 MS and marks the requested section as reserved.

At step 126, the cryptographic data store CDS1 stores the reservation in the reservation store CDS1 RS.

At step 128, the cryptographic data store CDS1 of the first computing engine VCP1 shares the reservation with the cryptographic data store CDS2 of the second computing engine VCP2.

At step 130, the second cryptographic data store CDS2 stores the reservation in the reservation store CDS2 RS of the second computing engine VCP2.

At step 132, the cryptographic data store CDS2 of the second computing engine VCP2 transmits a reservation confirmation to the cryptographic data store CDS1 of the first computing engine VCP1.

At step 134, the first cryptographic data store CDS1 fetches cryptographic primitive shares from the cryptographic primitive share store CDS1 TS of the first computing engine.

At step 136, the first cryptographic data store CDS1 updates the metadata store CDS1 MS and marks the cryptographic primitive as having been consumed.

At step 138, the first cryptographic data store CDS1 sends the cryptographic primitive shares to the CDS client of the first computing engine VCP1.

At step 140, the CDS client of the second computing engine VCP2 requests cryptographic primitives from the cryptographic data store CDS2 of the second computing engine CDS2.

At step 142, cryptographic data store CDS2 of the second computing engine VCP2 fetches the reservation from the reservation store CDS2 RS of the second computing engine VCP2.

At step 144, the cryptographic data store CDS2 of the second computing engine VCP2 fetches cryptographic primitive shares from the cryptographic primitive data store CDS2 TS of the second computing engine VCP2.

At step 146, the cryptographic data store CDS2 of the second computing engine VCP2 updates the metadata in the second meta data store CDS2 MS to mark the corresponding cryptographic primitive as having been consumed.

At step 148, the cryptographic data store CDS2 of the second computing engine VCP2 sends the cryptographic primitive shares to the CDS client of the second computing engine VCP2.

Figure 12:
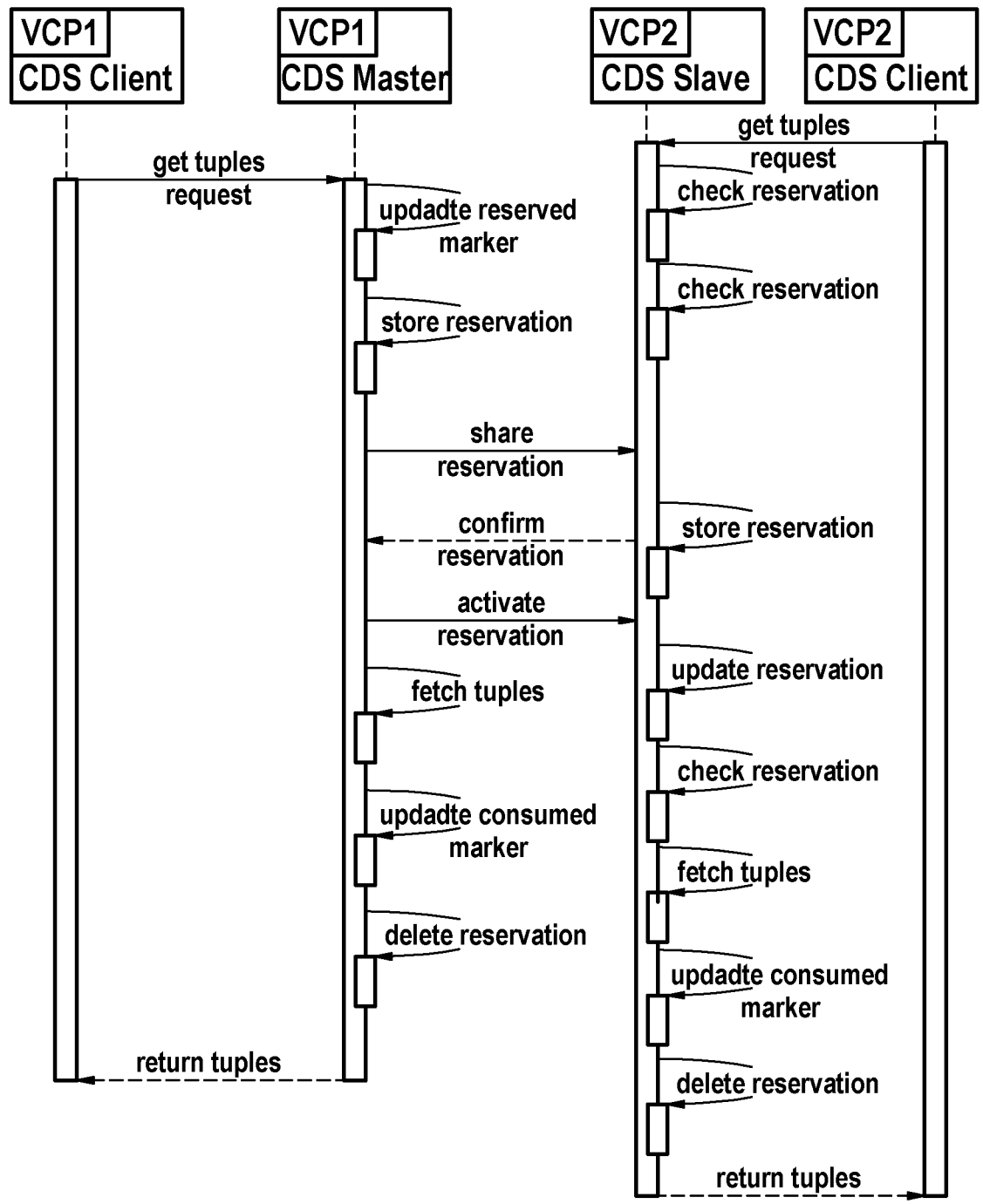
FIG. 12 schematically illustrates signalling between computing engines during a cryptographic primitive distribution operation, in accordance with the present invention.

FIG. 12 schematically illustrates signalling between computing engines during a cryptographic primitive distribution operation.

Figure 13:
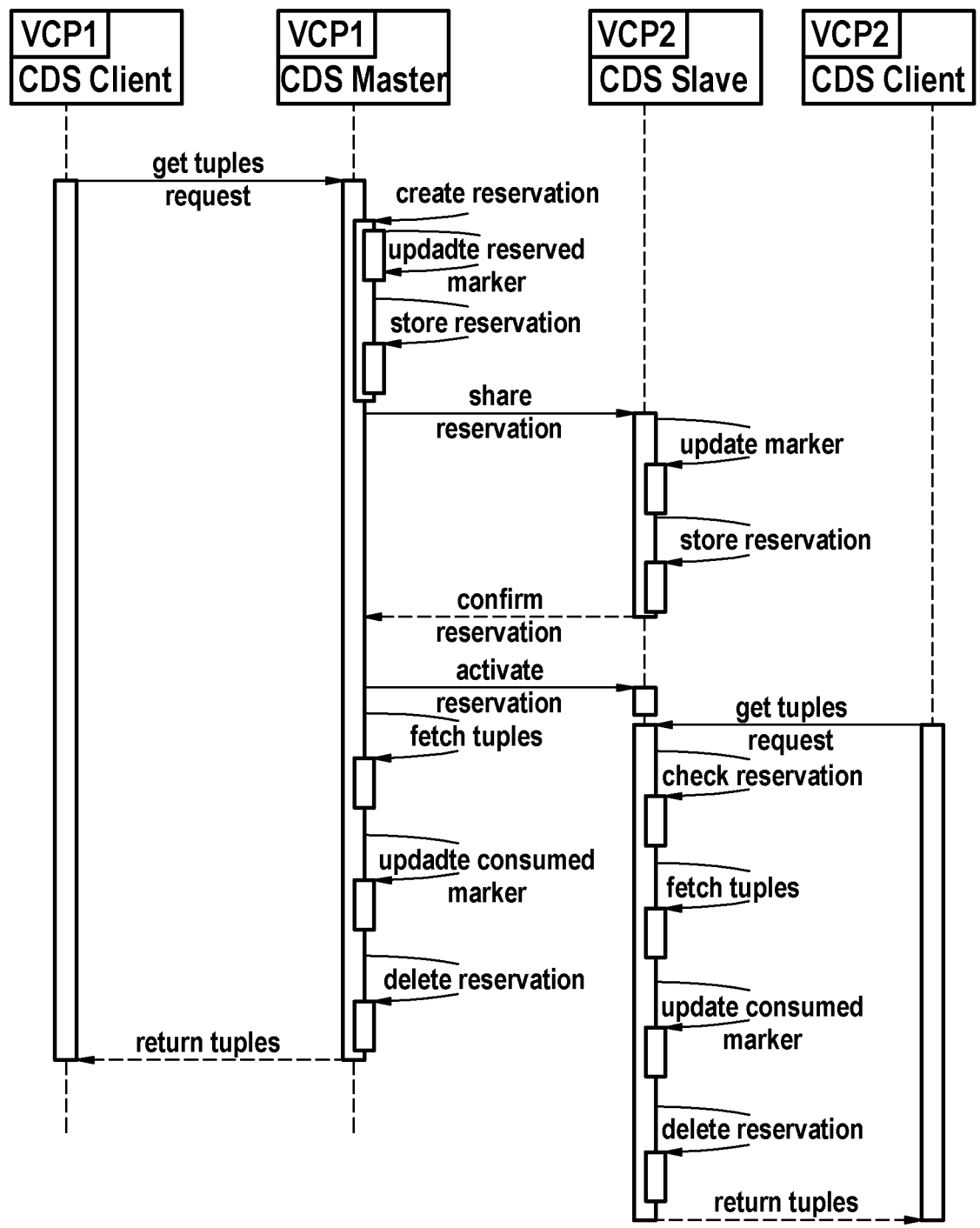
FIG. 13 schematically illustrates signalling between computing engines during a cryptographic primitive distribution operation, in accordance with the present invention.

FIG. 13 schematically illustrates signalling between computing engines during a cryptographic primitive distribution operation.

Accordingly, in an embodiment, the computer-implemented method 200 according to the first aspect, further comprises provisioning a set of cryptographic primitives across the distributed data processing service 30 by:
  transmitting a cryptographic primitive chunk provisioning request from the first computing engine VCP1 to at least the second computing engine VCP2;
  agreeing, between the first computing engine VCP1 and at least the second computing engine VCP2; a cryptographic primitive identifier identifying shared cryptographic primitives across at least the first computing engine VCP1 and at least the second computing engine VCP2;
  sending a status update request between at least the first and second computing engines for the cryptographic primitive chunk with the specific cryptographic primitive identifier; and
  setting a status flag of the cryptographic primitive chunk to an activated status, in order to make the contained tuple shares available for subsequent usage.

According to a further embodiment, the computer-implemented method further comprises using the cryptographic primitives by:
  transmitting, from the first computing engine VCP1 to at least the second computing engine VCP2, a cryptographic primitive reservation request;
  marking the cryptographic primitives in the cryptographic data store CDS of the second computing engine VCP2 referenced by the cryptographic primitive reservation as reserved;
  activating, in the first and second computing engines, the cryptographic primitives referenced by the cryptographic primitive reservation when the first computing engine VCP1 determines that the cryptographic primitive reservation has been successfully shared with at least the second computing engine VCP2; and
  once the requested cryptographic primitives have been sent to the first computing engine VCP1, marking the corresponding cryptographic primitives in the second computing engine VCP2 as consumed.

Distributed Object Store Service (OSS)

Figure 8:
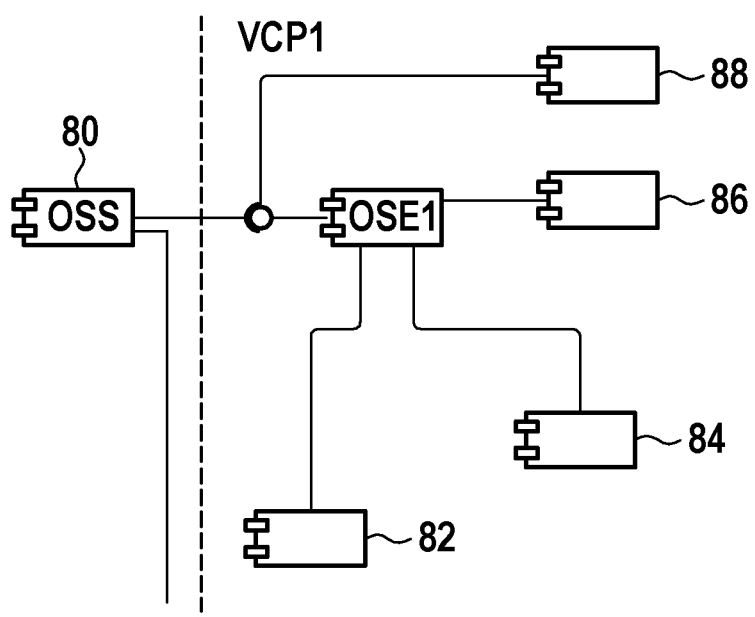
FIG. 8 schematically illustrates an example of a distributed object store service, in accordance with the present invention.

FIG. 8 schematically illustrates an example of a distributed object store service.

The distributed object store service is exposed to the remainder of the distributed data processing service 30 via distributed object store API 80. The distributed object store API 80 provides a service for storing any number of objects of arbitrary size, and enables the attachment of meta data (optionally in clear text) to objects. The service encrypts stored data at rest, and implements secure data upload and download protocols.

Owing to the distributed nature of the secure multiparty computation, all object store engines OSE 1,2 should be available to enable availability of the distributed object store API 80.

The object store service OSS relies, in each local computing engine VCP1, on an object store engine OSE1. The object store engine OSE1 organises the storage of, inter-alia, secret shares required by a multiparty competition algorithm operated by a distributed multiparty computation service MCS. Accordingly, the object store engine OSE1 interacts with a storage backend 82 capable of interacting with one of the services discussed above in relation to the storage backend 74 of the CDS.

In an embodiment, each object store engine OSE1 in a given computing engine VCP1 is communicatively coupled to a database 84 configured to store meta data associated with secret shares in the storage backend 74. Optionally, data stored in the database 84 is plain text.

In an embodiment, each object store engine OSE1 in a given computing engine VCP1 is capable of obtaining, from the respective local cryptographic datastore CDS1, an input mask. In an embodiment, as part of a secret share protocol, the object store engine OSE1 applies the input mask obtained from the local cryptographic datastore CDS1 to data stored in the storage backend 74 of the CDS.

Multiparty Computation Service (MCS)

Figure 9:
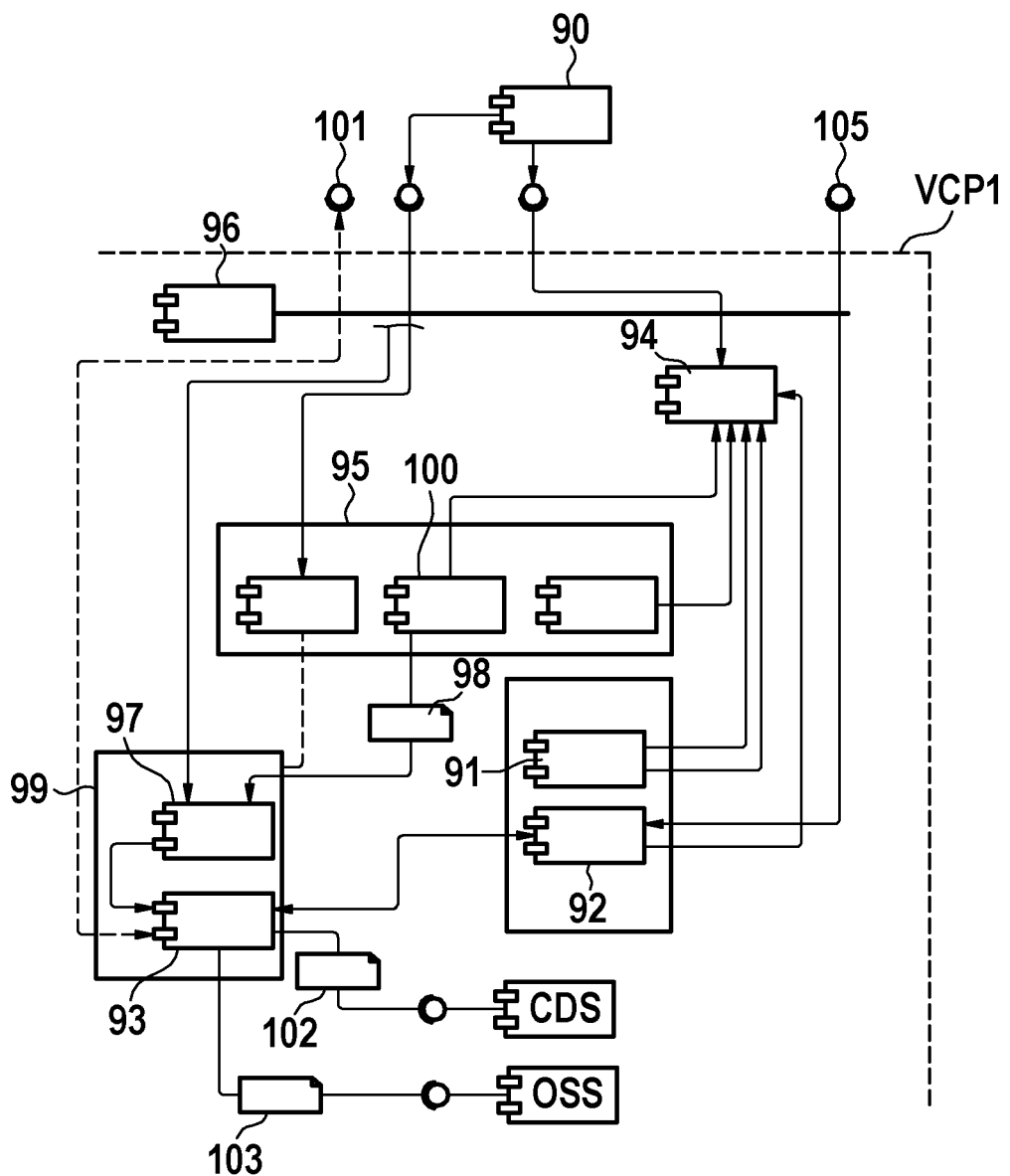
FIG. 9 schematically illustrates an example of a multiparty computation service, in accordance with the present invention.

FIG. 9 schematically illustrates an example of a multiparty computation service.

The multiparty computation service is available to the distributed data processing service 30 via the multiparty computation client 90. The multiparty computation client is communicatively coupled to all computing engines VCP1,2 in a virtual cloud VC. The multiparty computation client 90 is configured to dispatch API calls across, for example, Kubernetes™ API servers of all computing engines VCP1, VCP2 that are part of a distributed data processing service 30 (VC).

In embodiment, for each multiparty computation function, the client generates a unique execution identifier. The unique execution identifier may be used to correlate executions across each computing engine VCP1, VCP2.

The principal components of a multiparty computing engine are a network controller 91, a discovery service 92, and a function container 93. Auxiliary components are provided by underlying technologies such as a container orchestrator 94 (optionally implemented using Kubernetes). Furthermore, each multiparty computing engine comprises a serverless engine 95 for performing computer operations. In an embodiment, the service engine 95 is implemented using Knative.

In an embodiment, the function container is monitored by a queue monitor 97 capable of returning metrics 98 (such as computation queue length) to the service engine 95.

The function container 93 is configured to perform the secure multiparty computation. It accepts one or more input parameters, fetches and writes one or more secret shares from the object store service OSS, compiles the source code of the secure multiparty computation (which is what defines the exact computation to be performed), secret shares obtained from the object store service OSS: an embodiment, the function container 93 exposes a communication point (such as an HTTP endpoint) that enables the triggering of the execution of a MPC programme contained within the function container 93. In an embodiment, instances of the container are started as a "function pod" created by the service engine 95 (such as Knative™). The number of pods is controlled by the autoscaling 100 of the service engine 95. In embodiment, pods may be kept alive across several requests, in which case function invocation latency is reduced.

The function container is configured to receive the user-provided multiparty computation program. In one implementation, instances of the function container are initialised as part of a function pod 99 created by the service engine 95.

In embodiment, the number of pods is controlled by an autoscaler 100 in the service engine 95. In an embodiment, the service engine 95 is configured to increase the number of function pods 99 performing a secure multiparty computation in response to an indication from the queue monitor 97 that the queue is above a predetermined threshold. In an embodiment, the service engine 95 is configured to decrease the number of function pods 99 performing a secure multiparty computation in response to an indication from the queue monitor 97 that the queue is below a predetermined threshold.

The network controller service 91 represents an orchestration controller (such as a Kubernetes™ controller) capable of managing a network custom resource definition. In one example, the network controller service 91 may interact with an ISTIO service 96 to open ports and allow network traffic between the players.

In embodiment, the MPC service exposes a TCP endpoint 101 for executing the multiparty computation protocol across all players using the distributed data processing service 30 (VC). In an embodiment, the network controller service 91 is configured to expose a port range to enable access across the, subsequently, function pod specific TCP ports.

The discovery service 92 is configured to coordinate computation steps between a "master" VPC and "slave" VCPs to the secure multiparty computation, and to configure various network parameters necessary to enable communication between parties to the secure multiparty computation. For example, the discovery service 92 may perform the VC game execution protocol as illustrated in FIG. 5.

For example, the discovery service 92 collects and distributes player endpoint information throughout the distributed data processing service 30 (VC). The discovery service 92 may expose an HTTPS endpoint 105. The TCP endpoint information for a given function pod 93 is registered with the discovery service 92. As soon registrations from other computing engines (VCP2) have been received for a given execution, the discovery service 92 receives a list of endpoints of all registered players for the given execution.

Before the computation of a multiparty computation within a given function pod 93 is performed, correlated randomness (such as beaver triples or other cryptographic primitives 202) is obtained from the distributed cryptographic datastore service CDS. The type and number of cryptographic primitives obtained from the CDS may, for example, be specified by the service engine 95. In an embodiment, the correlated randomness is obtained using a streaming process overlapped with at least one MPC computation, to reduce execution latency.

The multiparty computation contained within the function pod 93 may read and write to the object store service OSS via an I/O function 103.

In an embodiment, the service engine 95 of the distributed multiparty computation service is configured to analyse a pending workload of one or more of the first or second computation engines. If the service engine 95 discovers that the pending workload will exceed a predetermined I/O interface usage threshold, the service engine 95 is configured to cause one or more additional containers to be spawned to support the distributed object store service.

In an embodiment, the service engine 95 of the distributed multiparty computation service is configured to analyse a pending workload of one or more of the first or second computation engines. If the service engine 95 discovers that the pending workload will exceed a predetermined usage threshold, the service engine 95 is configured to cause one or more additional containers to be spawned to support the distributed cryptographic data store service, the distributed multiparty computation service, and/or the distributed cryptographic data store service.

In an embodiment, at least one multiparty computation engine MPC1 comprises a load monitor configured to increase or decrease a number of compute instances available to the multiparty computation service based on a current or anticipated need.

Execution Identifiers

When a client sends a service invocation of an MPC programme in a VC, it sends a message, for example an HTTP(S) request, to the multiparty computation service of each VCP. These service invocations each include an execution identifier. In an embodiment, the identifier may be an instance of 128-bit UUID Type 4, although other identification types may be used.

The identifier is sampled randomly from a sufficiently large space of potential values to keep the risk of collisions low.

After the MPC services hosted by each computing engine VCP1, VCP2, have received the requests, they use the execution identifier to ensure that the MPC engines can learn with which remote computing engines (there can be at least two MPCs active, at a given time, for servicing various client requests). In an embodiment, the MPC engines may cooperate. For this purpose a distributed discovery service (DDS) similar to that outlined previously is used. The DDS is optionally coordinated from the MPCs of each VPC, although this is not essential. Each MPC service instance registers itself with the DDS.

When the DDS has received all registrations from all VCPs in a VC for a given execution identifier, it broadcasts the list of all registrations to all VCPs. With that information available (and after the Service Meshes in each VCP have been configured accordingly), the multiparty computing service MPC engines can establish the mutual connections used to execute the MPC protocol.

In an embodiment, the execution identifier is also used to derive identifiers for fetching the required offline cryptographic primitives (tuples) from the cryptographic data store of a respective VCP.

In an embodiment, the execution identifier is also used to derive for any output object generated by the multiparty computation service on a given VCP. For generating identifiers to interrogate the object data store, the fact that all MPC executions are performed in synchrony across the VCPs (because multiplications require synchronous communication between the MPC parties) is exploited.

Accordingly, a plurality of output instructions are in the same order across each VCPs.

In other words, consecutive numbers $i=0, \ldots, n-1$ are assigned to n outputs $o\_i$ of the computation consistently across all VCPs. The object store object identifiers are derived using a mapping function $ID(o\_i)=f(execution\_id, i)$.

In an embodiment, a client VCC1 external to the VCP can fetch the secret shares for the ith result of the computation with execution identifier eid by requesting the object with the identifier $f(eid, i)$ from the object store services of the VCPs within the VC. The same communication principle is used for requesting consistent chunks of tuples from the cryptographic data store CDS for consumption during multiparty computation service's program execution.

System

FIG. 1A schematically illustrates a system for providing a distributed data processing service according to the second aspect.

According to the second aspect, there is provided a system 10 for providing a distributed data processing service 30, VC for performing a secure multiparty computation of a function on at least first $x_1$ and second $x_2$ items of private input data, comprising:
 at least first VCC1 and second VCC2 client terminals;
 at least first VCP1 and second VCP2 computing engines; and
 a communication network 11 configured to communicatively couple the at least first VCC1 and second VCC2 client terminals and the at least first VCP1 and second VCP2 computing engines.

The at least first VCP1 and second VCP2 computing engines are configured to establish a binding 18 to provide the distributed data processing service VC.

The at least first VCP1 and second VCP2 computing engines comprise first and second cryptographic engines configured to provide a distributed cryptographic generation service configured to provide a plurality of cryptographic primitives required during an online phase of the secure multiparty computation.

A proportion of the cryptographic primitives are generated during an offline phase prior to the secure multiparty computation, and the plurality of cryptographic primitives are stored by a distributed cryptographic data store service CDS provided by corresponding at least first and second cryptographic data stores CDS1,2 managed by the respective first and second computing engines.

The distributed data processing service 30 is configured to obtain service invocations of a secure multiparty computation and at least first and second items of private input data.

The first VCP1 and second VCP2 computing engines are configured to store at least first and second items of private input data using a distributed object store service of the distributed data processing service provided by at least first and second object store engines managed by the corresponding first and second computing engines.

The first and second computing engines are configured to perform, during an online phase, a distributed secure multiparty computation on at least the first and second items of private input data using a distributed multiparty computation service of the distributed data processing service provided by first and second multiparty computing engines managed by the corresponding first and second computing engines, wherein the first multiparty computing engine performs a portion of the secure multiparty computation together with at least the second multiparty computing engine.

The system is further configured to store at least one result of the secure multiparty computation via the distributed object store service, and/or outputting the at least one result to at least the first or the second client.

According to a third aspect, there is provided a computer-implemented method of a first computing engine for coordinating a distributed data processing service for performing a secure multiparty computation of a function on at least first and second items of private input data using at least the first and second computing engines communicatively coupled via a communication network, the method comprising:

establishing, by communicating with at least the second computing engine, the distributed data processing service by binding at least the second computing engine to the first computing engine;

generating, using a first cryptographic engine managed by the first computing engine, a first plurality of cryptographic primitives required by the first computing engine during an online phase of the secure multiparty computation, wherein a proportion of the cryptographic primitives are generated during an offline phase prior to the secure multiparty computation, and the plurality of cryptographic primitives generated by the first computing engine are stored by a first cryptographic data store managed by the respective first engines;

obtaining, by the distributed data processing service, a service invocation of a secure multiparty computation and an item of private input data from at least a first client;

storing the item of private input data in a first object store engine managed by the first computing engine;

performing, during an online phase, a distributed secure multiparty computation on at least the first and second items of private input data using a distributed multiparty computation service of the distributed data processing service provided by the first and second multiparty computing engines managed by the corresponding first and second computing engines, wherein the first multiparty computing engine performs a first portion of the secure multiparty computation; and storing a first result of the secure multiparty computation via the distributed object store service, and/or outputting the at least a first result to the first client.

According to a fourth aspect, there is provided a computer-implemented method of a second computing engine for participating in a distributed data processing service for performing a secure multiparty computation of a function on at least first and second items of private input data using at least a first and the second computing engine in communicatively coupled via a communication network, the method comprising:

receiving, from the first computing engine, a request to bind to the first computing engine, and binding at least the second computing engine to the first computing engine to initialize the distributed data processing service;

generating, at the command of the first computing engine and using a second cryptographic engine of the second computing engine, a plurality of cryptographic primitives required by the second computing engine during an online phase of the secure multiparty computation, wherein a proportion of the cryptographic primitives are generated during an offline phase prior to the secure multiparty computation, and the second plurality of cryptographic primitives generated by the second computing engine are stored by a second cryptographic data store managed by the second computing engine;

obtaining, by the distributed data processing service, a service invocation of a secure multiparty computation and a further item of private input data from a second client;

storing the further item of private input data in a second object store engine managed by the second computing engine;

performing, during an online phase, a distributed secure multiparty computation on at least the first and second items of private input data using a distributed multiparty computation service of the distributed data processing service provided by first and second multiparty computing engines managed by corresponding first and second computing engines, wherein the second multiparty computing engine performs a second portion of the secure multiparty computation; and storing a second result of the secure multiparty computation via the distributed object store service, and/or outputting the second result to the second client.

As described above, each secret share provides an encrypted version of a portion of each value to each computing engine VCP1, VCP2. The cryptographic key data includes a share of the encrypted MAC cryptographic key for the first computing engine VCP1, a public key pk, and a share of a private key sk; that is shared with the first computing engine VCP1.

The second computing engine VCP2 includes a memory with similar data structures except that it stores a different set of private data, different sets of secret value shares, and different shares of the private key and MAC key in the cryptographic key data.

According to a fifth aspect, there is provided a computer readable medium or a data signal having encoded thereon at least one computer program defining machine-readable instructions which, when executed by a computer processor, is capable of carrying out either (i) the computer-implemented method according to the first aspect, or its embodiments, and/or (ii) the computer-implemented method according to the third aspect, and/or (iii) the computer-implemented method according to the fourth aspect.

In an example, the first VCP1 and second VCP2 computing engines may be a server, cloud-based server, a personal computer, or an embedded computer. It is not essential that the processing occurs on one physical processor. For example, a computing engine can divide the processing task across a plurality of processor cores on the same processor, or across a plurality of different processors, or virtual machines. The processor may support a Kubernetes™ service, optionally provided on a commercial cloud processing service.

Referring to the first computing engine VCP1 and/or the second computing engine VCP2 in more detail, the computing engine includes a processor that is operatively connected to a network interface device and a memory. The processor is typically a central processing unit (CPU) with one or more processing cores that execute stored program instructions in the memory to implement the embodiments described herein. However, other embodiments of the processor optionally use different processing elements instead of, or in addition to, a CPU including graphics processing units (GPUs), field programmable gate arrays (FPGAs), application specific integrated circuits (ASICs), digital signal processors (DSPs), and any other digital logic device that is configured to perform the operations described herein.

In some embodiments, the processor implements a hardware random number generator (RNG) or uses a software random number generator or pseudo-random number generator (PRNG) to generate random values for providing correlated randomness to the first and second cryptographic engines. In the description herein, any reference to the generation of a random value or use of a random value refers to the operation of an RNG or PRNG to generate a value in a uniformly random manner selected from a predetermined numeric range (e.g. the finite field Fp).

The network interface device connects the first computing engine VCP1 and/or the second computing engine VCP2 to a data network, such as a local area network (LAN) or wide area network (WAN) to enable communication between the first computing engine VCP1 and the second computing engine VCP2 of FIG. 1A, and to additional engines that perform the processes described herein.

Non-limiting embodiments of the network interface device include a wired network devices such as an Ethernet adapter or wireless network devices such as a wireless LAN or wireless WAN network adapter. In the system 10, all transmissions of data that are made through the communications network 11 are assumed to be observed by third party adversaries that can record a proportion of the data transmitted from the first computing engine VCP1 and the second computing engine VCP2, although the first computing engine VCP1 and/or the second computing engine VCP2 may communicate using a transport layer security (TLS) encrypted and authenticated channel or other equivalent communication channel that prevents eavesdroppers from observing or altering communications via the network 11.

The memory includes one or more volatile memory devices such as random access memory (RAM) and non-volatile memory devices such as magnetic disk or solid state memory devices that store the program instructions, private plaintext data, cryptographic key data, and the computed result of the multiparty computation.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected. The examples provided in the drawings and described in the foregoing written description are intended for providing an understanding of the principles of this specification.

What is claimed is:

1. A computer-implemented method for providing a distributed data processing service for performing a secure multiparty computation of a function on at least first and second items of private input data using at least a first and a second computing engine communicatively coupled via a communication network, the method comprising the following steps:

establishing, using the first computing engine, the distributed data processing service by binding at least the second computing engine to the first computing engine;

generating, using a distributed cryptographic generation service provided by first and second cryptographic engines managed by the first and second computing engines, respectively, a plurality of cryptographic primitives required during an online phase of the secure multiparty computation, wherein a proportion of the cryptographic primitives are generated during an offline phase prior to the secure multiparty computation, and the plurality of cryptographic primitives are stored by a distributed cryptographic data store service provided by corresponding at least first and second cryptographic data stores managed by the first and second computing engines, respectively;

obtaining, by the distributed data processing service, service invocations of a secure multiparty computation and at least first and second items of private input data;

storing the at least first and second items of private input data in a distributed object store service of the distributed data processing service provided by at least first and second object store engines managed by the first and second computing engines, respectively;

performing, during an online phase, a distributed secure multiparty computation on at least the first and second items of private input data using a distributed multiparty computation service of the distributed data processing service provided by first and second multiparty computing engines managed by the respective first and second computing engines, wherein the first multiparty computing engine performs the secure multiparty computation together with at least the second multiparty computing engine; and storing at least one result of the secure multiparty computation via the distributed object store service, and/or outputting the at least one result to at least a first or second client;

using the cryptographic primitives by:
   transmitting, from the first computing engine to at least the second computing engine, a cryptographic primitive reservation request;
   marking the cryptographic primitives in the cryptographic data store of the second computing engine referenced by the cryptographic primitive reservation as reserved;
   activating, in the first and second computing engines, the cryptographic primitives referenced by the cryptographic primitive reservation when the first computing engine determines that the cryptographic primitive reservation has been successfully shared with at least the second computing engine;
   once the requested cryptographic primitives have been sent to the first computing engine, marking the corresponding cryptographic primitives in the second computing engine as consumed.

2. The computer-implemented method according to claim 1, wherein: (i) the establishing of the distributed data processing service includes instantiating a virtual cloud including at least the first and second computing engines and/or (ii) the binding of the at least the second computing engine to the first computing engine includes establishing and exchanging initial cryptographic primitives to establish at least one authenticated communication channel between the at least first and second computing engines.

3. The computer-implemented method according to claim 2, wherein the initial cryptographic primitives include one or more homomorphic keys or a shared message authentication code (MAC) key.

4. The computer-implemented method according to claim 1, further comprising:
performing a discovery process after the establishing of the distributed data processing service, wherein the discovery process includes:
orchestrating, via the first multiparty computing engine, a discovery protocol to identify a presence of at least the second multiparty computing engine in a virtual cloud and a communication endpoint identifier of the second computing engine and/or the second multiparty computing engine;
establishing, a communication channel to communicatively couple the first multiparty computing engine to at least the second multiparty computing engine;
orchestrating, via the first multiparty computing engine, the secure multiparty computation using at least the first and second multiparty computing engines communicating over the communication channel.

5. The computer-implemented method according to claim 1, wherein the distributed data processing service for performing the secure multiparty computation of a function applies one of a SPDZ protocol, or a Fresco implementation, or a scale mamba implementation.

6. The computer-implemented method according to claim 1, wherein the at least first and second computing engines providing portions of each of the distributed cryptographic generation service, the distributed cryptographic data store service, the distributed object store service, and the distributed secure multiparty computation service are implemented using a container orchestration-based service.

7. The computer-implemented method according to claim 6, wherein the container orchestration-based service includes Kubernetes™, or Mesos™, or Docker Swarm™.

8. The computer-implemented method according to claim 1, further comprising:
monitoring, via a load monitor of the distributed cryptographic generation service, a present or anticipated computational load on one or more of the distributed cryptographic generation service, the distributed cryptographic data store service, the distributed object store service, and the distributed secure multiparty computation;
based on the load monitor determining that the present or anticipated computational load exceeds, or will exceed, an upper load threshold, instructing a container orchestrator to increase a number of containers providing one or more of the distributed cryptographic generation service, the distributed cryptographic data store service, the distributed object store service, and the distributed secure multiparty computation, as appropriate; and/or
based on the load monitor determining that the present or anticipated computational load falls below, or will fall below, a lower load threshold, instructing the container orchestrator to reduce the number of containers providing one or more of the distributed cryptographic generation service, the distributed cryptographic data store service, the distributed object store service, and the distributed secure multiparty computation.

9. The computer-implemented method according to claim 1, further comprising:
monitoring, at the first cryptographic engine managed by the first computing engine, a level of cryptographic primitives stored, respectively, in the at least first and second cryptographic data stores;
generating, at the first cryptographic engine, one or more cryptographic primitive generation schedules based on the level of stored cryptographic primitives across at least the first and second cryptographic data stores;
distributing the one or more cryptographic primitive generation schedules to at least the second cryptographic engine; and
generating a first plurality of cryptographic primitives using the first cryptographic engine in synchrony with a second plurality of cryptographic primitives using the second cryptographic engine in accordance with the one or more cryptographic primitive generation schedules.

10. The computer-implemented method according to claim 1, further comprising:
provisioning a set of cryptographic primitives across the distributed data processing service by:
transmitting a cryptographic primitive chunk provisioning request from the first computing engine to at least the second computing engine;
agreeing, between the first computing engine and at least the second computing engine, on a specific cryptographic primitive identifier identifying shared cryptographic primitives across at least the first computing engine and at least the second computing engine;
sending a status update request between at least the first and second computing engines for the cryptographic primitive chunk with the specific cryptographic primitive identifier; and
setting a status flag of the cryptographic primitive chunk to an activated status, to make contained tuple shares available for subsequent usage.

11. The computer-implemented method according to claim 1, wherein the distributed data processing service for performing the secure multiparty computation guarantees that the first private input data is confidential to the first client, and that the second private input data is confidential to the second client, provided that at least one of the at least first and second computing engines remains uncompromised.

12. A system for providing a distributed data processing service for performing a secure multiparty computation of a function on at least first and second items of private input data, comprising:
at least first and second client terminals;
at least first and second computing engines; and
a communication network configured to communicatively couple the at least first and second client terminals and the at least first and second computing engines;
wherein the at least first and second computing engines are configured to establish a binding to provide the distributed data processing service;
wherein the at least first and second computing engines include first, and second cryptographic engines configured to provide a distributed cryptographic generation service configured to provide a plurality of cryptographic primitives required during an online phase of the secure multiparty computation;
wherein a proportion of the cryptographic primitives are generated during an offline phase prior to the secure multiparty computation, and the plurality of cryptographic primitives are stored by a distributed cryptographic data store service provided by corresponding at least first and second cryptographic data stores managed by the first and second computing engines, respectively;

wherein the distributed data processing service is configured to obtain service invocations of a secure multiparty computation and at least first and second items of private input data;

wherein the first and second computing engines are configured to store the at least first and second items of private input data using a distributed object store service of the distributed data processing service provided by at least first and second object store engines managed by the first and second computing engines, respectively;

wherein the first and second computing engines (are configured to perform, during the online phase, a distributed secure multiparty computation on at least the first and second items of private input data using a distributed multiparty computation service of the distributed data processing service provided by first and second multiparty computing engines managed by the first and second computing engines, respectively, wherein the first multiparty computing engine performs the secure multiparty computation together with at least the second multiparty computing engine; and wherein at least one result of the secure multiparty computation is stored via the distributed object store service, and/or output to at least the first or the second client terminals;

wherein the system is configured to use the cryptographic primitives by:
transmitting, from the first computing engine to at least the second computing engine, a cryptographic primitive reservation request;
marking the cryptographic primitives in the cryptographic data store of the second computing engine referenced by the cryptographic primitive reservation as reserved;
activating, in the first and second computing engines, the cryptographic primitives referenced by the cryptographic primitive reservation when the first computing engine determines that the cryptographic primitive reservation has been successfully shared with at least the second computing engine;
once the requested cryptographic primitives have been sent to the first computing engine, marking the corresponding cryptographic primitives in the second computing engine as consumed.

13. The system according to claim 12, further comprising:
an orchestration engine configured to provide a container orchestration-based service;
wherein the at least first and second computing engines provide portions of each of the distributed cryptographic generation service, the distributed cryptographic data store service, the distributed object store service, and the distributed secure multiparty computation service are capable of horizontal scaling at a command of the orchestration engine.

14. A computer-implemented method of a first computing engine for participating in a distributed data processing service for performing a secure multiparty computation of a function on at least first and second items of private input data using at least the first and second computing engines in communicatively coupled via a communication network, the method comprising the following steps:

initiating, by communicating with at least the second computing engine, the distributed data processing service by binding at least the second computing engine to the first computing engine;
generating, using a first cryptographic engine managed by the first computing engine, a first plurality of cryptographic primitives required by the first computing engine during an online phase of the secure multiparty computation, wherein a proportion of the cryptographic primitives are generated during an offline phase prior to the secure multiparty computation, and the plurality of cryptographic primitives generated by the first computing engine are stored by a first cryptographic data store managed by the first computing engine;
obtaining, by the distributed data processing service, a service invocation of a secure multiparty computation, and an item of private input data from at least a first client;
storing the item of private input data in a first object store engine managed by the first computing engine;
performing, during an online phase, a distributed secure multiparty computation on at least the first and second items of private input data using a distributed multiparty computation service of the distributed data processing service provided by the first and second multiparty computing engines managed by the first and second computing engines, respectively, wherein the first multiparty computing engine performs a first portion of the secure multiparty computation; and
storing a first result of the secure multiparty computation via the distributed object store service, and/or outputting the at least a first result to a first client;
using the cryptographic primitives by:
transmitting, from the first computing engine to at least the second computing engine, a cryptographic primitive reservation request;
marking the cryptographic primitives in the cryptographic data store of the second computing engine referenced by the cryptographic primitive reservation as reserved;
activating, in the first and second computing engines, the cryptographic primitives referenced by the cryptographic primitive reservation when the first computing engine determines that the cryptographic primitive reservation has been successfully shared with at least the second computing engine;
once the requested cryptographic primitives have been sent to the first computing engine, marking the corresponding cryptographic primitives in the second computing engine as consumed.

15. A computer-implemented method of a second computing engine for participating in a distributed data processing service for performing a secure multiparty computation of a function on at least first and second items of private input data using at least a first and the second computing engine in communicatively coupled via a communication network, the method comprising the following steps:
acknowledging, from the first computing engine, a request to bind to the first computing engine, and binding at least the second computing engine to the first computing engine to initialize the distributed data processing service;
generating, at a command of the first computing engine and using a second cryptographic engine of the second computing engine, a plurality of cryptographic primitives required by the second computing engine during an online phase of the secure multiparty computation, wherein a proportion of the cryptographic primitives are generated during an offline phase prior to the secure multiparty computation, and the second plurality of cryptographic primitives generated by the second computing engine are stored by a second cryptographic data store managed by the second computing engine;

obtaining, by the distributed data processing service, a further item of private input data from a second client;

storing the further item of private input data in a second object store engine managed by the second computing engine;

performing, during an online phase, a distributed secure multiparty computation on at least the first and second items of private input data using a distributed multiparty computation service of the distributed data processing service provided by first and second multiparty computing engines managed by the first and second computing engines, respectively, wherein the second multiparty computing engine performs a second portion of the secure multiparty computation; and storing a second result of the secure multiparty computation via the distributed object store service, and/or outputting the second result to the second client;

using the cryptographic primitives by:
  receiving, from the first computing engine from at least the second computing engine, a cryptographic primitive reservation request;
  marking the cryptographic primitives in the cryptographic data store of the second computing engine referenced by the cryptographic primitive reservation as reserved;
  activating, in the first and second computing engines, the cryptographic primitives referenced by the cryptographic primitive reservation when the first computing engine determines that the cryptographic primitive reservation has been successfully shared with at least the second computing engine;
  once the requested cryptographic primitives have been sent to the first computing engine, marking the corresponding cryptographic primitives in the second computing engine as consumed.

16. A non-transitory computer readable medium on which is stored a computer program for providing a distributed data processing service for performing a secure multiparty computation of a function on at least first and second items of private input data using at least a first and a second computing engine communicatively coupled via a communication network, the computer program, when executed by a computer processor, causing the computer processor to perform the following steps:

establishing, using the first computing engine, the distributed data processing service by binding at least the second computing engine to the first computing engine;

generating, using a distributed cryptographic generation service provided by first and second cryptographic engines managed by the first and second computing engines, respectively, a plurality of cryptographic primitives required during an online phase of the secure multiparty computation, wherein a proportion of the cryptographic primitives are generated during an offline phase prior to the secure multiparty computation, and the plurality of cryptographic primitives are stored by a distributed cryptographic data store service provided by corresponding at least first and second cryptographic data stores managed by the first and second computing engines, respectively;

obtaining, by the distributed data processing service, service invocations of a secure multiparty computation and at least first and second items of private input data;

storing the at least first and second items of private input data in a distributed object store service of the distributed data processing service provided by at least first and second object store engines managed by the first and second computing engines, respectively;

performing, during an online phase, a distributed secure multiparty computation on at least the first and second items of private input data using a distributed multiparty computation service of the distributed data processing service provided by first and second multiparty computing engines managed by the respective first and second computing engines, wherein the first multiparty computing engine performs the secure multiparty computation together with at least the second multiparty computing engine; and storing at least one result of the secure multiparty computation via the distributed object store service, and/or outputting the at least one result to at least a first or second client;

using the cryptographic primitives by:
  transmitting, from the first computing engine to at least the second computing engine, a cryptographic primitive reservation request;
  marking the cryptographic primitives in the cryptographic data store of the second computing engine referenced by the cryptographic primitive reservation as reserved;
  activating, in the first and second computing engines, the cryptographic primitives referenced by the cryptographic primitive reservation when the first computing engine determines that the cryptographic primitive reservation has been successfully shared with at least the second computing engine;
  once the requested cryptographic primitives have been sent to the first computing engine, marking the corresponding cryptographic primitives in the second computing engine as consumed.

* * * * *